(12) United States Patent
Ogasawara et al.

(10) Patent No.: US 10,388,960 B2
(45) Date of Patent: *Aug. 20, 2019

(54) NON-AQUEOUS ELECTROLYTE BATTERY AND METHOD OF MANUFACTURING THE SAME

(71) Applicant: SANYO Electric Co., Ltd., Daito-shi, Osaka (JP)

(72) Inventors: Takeshi Ogasawara, Daito (JP); Hiroshi Minami, Daito (JP); Naoki Imachi, Daito (JP); Atsushi Kaiduka, Daito (JP); Yasunori Baba, Daito (JP); Yoshinori Kida, Daito (JP); Shin Fujitani, Daito (JP)

(73) Assignee: SANYO Electric Co., Ltd., Osaka (JP)

( * ) Notice: Subject to any disclaimer, the term of this patent is extended or adjusted under 35 U.S.C. 154(b) by 227 days.

This patent is subject to a terminal disclaimer.

(21) Appl. No.: 15/657,893

(22) Filed: Jul. 24, 2017

(65) Prior Publication Data

US 2017/0324095 A1 Nov. 9, 2017

Related U.S. Application Data

(62) Division of application No. 14/729,401, filed on Jun. 3, 2015, now Pat. No. 9,761,880, which is a division
(Continued)

(30) Foreign Application Priority Data

Mar. 17, 2006 (JP) .................................. 2006-074554
Mar. 17, 2006 (JP) .................................. 2006-074556
(Continued)

(51) Int. Cl.
*H01M 4/62* (2006.01)
*H01M 4/505* (2010.01)
(Continued)

(52) U.S. Cl.
CPC ......... *H01M 4/622* (2013.01); *H01M 2/0408* (2013.01); *H01M 2/14* (2013.01);
(Continued)

(58) Field of Classification Search
None
See application file for complete search history.

(56) References Cited

U.S. PATENT DOCUMENTS 6,365,299 B1 4/2002 Miyaki et al.
7,105,251 B2 9/2006 Miyaki et al.
(Continued)

FOREIGN PATENT DOCUMENTS

JP 09-147835 A 6/1997
JP 2000-012018 A 1/2000
(Continued)

OTHER PUBLICATIONS

JP2006048942 English translation. Kubota. Japan. Feb. 2006. (Year: 2006).*
(Continued)

*Primary Examiner* — Christopher P Domone
(74) *Attorney, Agent, or Firm* — Westerman, Hattori, Daniels & Adrian, LLP

(57) ABSTRACT

A non-aqueous electrolyte battery is provided that shows good cycle performance and good storage performance under high temperature conditions and exhibits high reliability even with a battery configuration featuring high capacity. A method of manufacturing the battery is also provided. A non-aqueous electrolyte battery includes: a positive electrode having a positive electrode active material layer containing a positive electrode active material; a negative electrode having a negative electrode active material layer containing a negative electrode active material; a separator interposed between the positive electrode and the
(Continued)

negative electrode; an electrode assembly including the positive electrode, the negative electrode, and the separator; and a non-aqueous electrolyte impregnated in the electrode assembly, characterized in that: the positive electrode active material contains at least cobalt or manganese; and a coating layer is formed on a surface of the negative electrode active material layer, the coating layer including filler particles and a binder.

6 Claims, 4 Drawing Sheets

Related U.S. Application Data of application No. 12/293,388, filed as application No. PCT/JP2007/055444 on Mar. 16, 2007, now Pat. No. 9,077,024.

(30) Foreign Application Priority Data

| Jul. 27, 2006 | (JP) | ................................ | 2006-204940 |
|---|---|---|---|
| Jul. 31, 2006 | (JP) | ................................ | 2006-207451 |
| Mar. 13, 2007 | (JP) | ................................ | 2007-062818 |

(51) Int. Cl.

| *H01M 10/0525* | (2010.01) |
|---|---|
| *H01M 4/131* | (2010.01) |
| *H01M 4/587* | (2010.01) |
| *H01M 4/525* | (2010.01) |
| *H01M 10/0568* | (2010.01) |
| *H01M 2/04* | (2006.01) |
| *H01M 2/14* | (2006.01) |
| *H01M 2/16* | (2006.01) |
| *H01M 4/13* | (2010.01) |
| *H01M 4/133* | (2010.01) |
| *H01M 10/058* | (2010.01) |

(52) U.S. Cl.
CPC .............. *H01M 2/16* (2013.01); *H01M 4/13* (2013.01); *H01M 4/131* (2013.01); *H01M 4/133* (2013.01); *H01M 4/505* (2013.01); *H01M 4/525* (2013.01); *H01M 4/587* (2013.01); *H01M 4/62* (2013.01); *H01M 4/621* (2013.01); *H01M 10/058* (2013.01); *H01M 10/0525* (2013.01); *H01M 2/168* (2013.01); *H01M 10/0568* (2013.01); *H01M 2220/30* (2013.01); *H01M 2300/0025* (2013.01); *Y02E 60/122* (2013.01); *Y02P 70/54* (2015.11); *Y10T 29/49115* (2015.01)

(56) References Cited

U.S. PATENT DOCUMENTS

| 7,422,825 | B2 | 9/2008 | Inoue et al. |
|---|---|---|---|
| 7,682,751 | B2 | 3/2010 | Kato et al. |
| 2005/0037257 | A1 | 2/2005 | Akashi et al. |
| 2005/0186479 | A1 | 8/2005 | Totsuka et al. |
| 2006/0051663 | A1 | 3/2006 | Fujita et al. |
| 2006/0141352 | A1 | 6/2006 | Kato et al. |
| 2006/0194109 | A1* | 8/2006 | Watanabe ............. H01M 4/131 429/231.1 |
| 2006/0194116 | A1 | 8/2006 | Suzuki et al. |
| 2006/0216608 | A1 | 9/2006 | Ohata et al. |
| 2007/0037047 | A1 | 2/2007 | Ohashi et al. |
| 2008/0118833 | A1 | 5/2008 | Ueda et al. |
| 2008/0248394 | A1 | 10/2008 | Inoue et al. |
| 2008/0254369 | A1 | 10/2008 | Inoue et al. |
| 2011/0281165 | A1 | 11/2011 | Ueda et al. |

FOREIGN PATENT DOCUMENTS

| JP | 2001-266949 | A | | 9/2001 |
|---|---|---|---|---|
| JP | 2002-141042 | A | | 5/2002 |
| JP | 2004-063269 | A | | 2/2004 |
| JP | 2004-281158 | A | | 10/2004 |
| JP | 2004-342500 | A | | 12/2004 |
| JP | 2005-078800 | A | | 3/2005 |
| JP | 2005-235695 | A | | 9/2005 |
| JP | 2005-243303 | A | | 9/2005 |
| JP | 2005-259639 | A | | 9/2005 |
| JP | 2005-294216 | A | | 10/2005 |
| JP | 2005-310622 | A | | 11/2005 |
| JP | 2005-322610 | A | | 11/2005 |
| JP | 2006-048942 | A | | 2/2006 |
| JP | 2006048942 | | * | 2/2006 |
| JP | 2006-120604 | A | | 5/2006 |
| JP | 2006-173099 | A | | 6/2006 |
| WO | 97/01870 | A1 | | 1/1997 |
| WO | 2005/011043 | A1 | | 2/2005 |
| WO | 2005/029614 | A1 | | 3/2005 |
| WO | 2005/098996 | A1 | | 10/2005 |
| WO | 2005/098997 | A1 | | 10/2005 |
| WO | 2006/054604 | A1 | | 5/2006 |
| WO | 2007/037145 | A1 | | 4/2007 |

OTHER PUBLICATIONS

T. Ohzuku et al. "Solid-State Redox Reactions of LiCoO2 (R3m) for 4 Volt Secondary Lithium Cells," J. Electrochem. Soc.; vol. 141; No. 11; Nov. 1994; pp. 2972-2977.

International Search Report of PCT/JP2007/055444, dated Jun. 12, 2007 (in English; 16 pages).

Chinese Office Action dated May 27, 2010, issued in counterpart Chinese Patent Application No. 200780017785.1, (w/English translation, 14 pages).

Information Statement dated Jun. 30, 2011, issued in counterpart Japanese Patent Application No. 2007-62818 (w/English translation, 23 pages).

Information Statement dated May 21, 2012, issued in counterpart Japanese Patent Application No. 2007-62818 (w/English translation, 17 pages).

Japanese Office Action dated Jan. 8, 2013, issued in counterpart Japanese patent application No. 2007-062818 (3 pages).

\* cited by examiner

NON-AQUEOUS ELECTROLYTE BATTERY AND METHOD OF MANUFACTURING THE SAME

CROSS REFERENCE

This application is a divisional of U.S. application Ser. No. 14/729,401, filed on Jun. 3, 2015, which is a divisional of U.S. application Ser. No. 12/293,388, filed on Jan. 27, 2009, which is a National Stage of International Application No. PCT/JP2007/055444, filed on Mar. 16, 2007, which claims priority to Japanese Application No. 2006-074556 filed on Mar. 17, 2006, Japanese Application No. 2006-074554 filed on Mar. 17, 2006, Japanese Application No. 2006-204940 filed on Jul. 27, 2006, Japanese Application No. 2006-207451 filed on Jul. 31, 2006, and Japanese Application No. 2007-062818 filed on Mar. 13, 2007, each of the foregoing being hereby incorporated by reference.

TECHNICAL FIELD

The present invention relates to improvements in non-aqueous electrolyte batteries, such as lithium-ion batteries and polymer batteries, and methods of manufacturing the batteries. More particularly, the invention relates to, for example, a battery structure that is excellent in cycle performance and storage performance at high temperature and that exhibits high reliability even with a high-capacity battery configuration.

BACKGROUND ART

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, lithium-ion batteries that perform charge and discharge by transferring lithium ions between the positive and negative electrodes have been widely used as the driving power sources for the mobile information terminal devices.

The mobile information terminal devices tend to power consumption as the functions of the devices, such as moving picture playing functions and gaming functions. It is strongly desired that the lithium-ion batteries that are the drive power source for the devices have further higher capacities and higher performance in order to achieve longer battery life and improved output power.

Under these circumstances, the research and development efforts to provide lithium-ion batteries with higher capacities have been underway, which center around attempts to reduce the thickness of the battery can, the separator, or positive and negative electrode current collectors (e.g., aluminum foil or copper foil), as disclosed in Japanese Published Unexamined Patent Application No. 2002-141042, which are not involved in the power generating element, as well as attempts to increase the filling density of active materials (improvements in electrode filling density). These techniques, however, seem to be approaching their limits, and fundamental improvements such as finding alternative materials have become necessary to achieve a greater capacity in lithium-ion batteries. Nevertheless, regarding the attempts to increase the battery capacity through alternative positive and negative electrode active materials, there are few candidate materials for positive electrode active materials that are comparable or superior to the state-of-the-art lithium cobalt oxide in terms of capacity and performance, although alloy-based negative electrodes with Si, Sn, etc. appear to be promising as negative electrode active materials.

Under these circumstances, we have developed a battery with an increased capacity by raising the end-of-charge voltage of the battery, using lithium cobalt oxide as the positive electrode active material, from the currently common 4.2 V to a higher region to increase the utilization depth (charge depth). The reason why such an increase in the utilization depth can achieve a higher battery capacity may be briefly explained as follows. The theoretical capacity of lithium cobalt oxide is about 273 mAh/g, but the battery rated at 4.2 V (the battery with an end-of-charge voltage of 4.2 V) utilizes only up to about 160 mAh/g, which means that it is possible to increase the battery capacity up to about 200 mAh/g by raising the end-of-charge voltage to 4.4 V. Raising the end-of-charge voltage to 4.4 V in this way accomplishes about 10% increase in the overall battery capacity.

When lithium cobalt oxide is used at a high voltage as described above, the oxidation power of the charged positive electrode active material increases. Consequently, the decomposition of the electrolyte solution is accelerated, and moreover, the delithiated positive electrode active material itself loses the stability of the crystal structure. Accordingly, most important issues to be resolved have been the cycle life deterioration and the performance deterioration during storage due to the crystal disintegration. We have already found that addition of zirconia, aluminum, or magnesium to lithium cobalt oxide can achieve comparable performance to the 4.2 V battery even at a higher voltage under room temperature conditions. However, as recent mobile devices require higher power consumption, it is essential to ensure battery performance under high-temperature operating conditions so that the battery can withstand continuous operations in high temperature environments. For this reason, there is an imminent need to develop the technology that can ensure sufficient battery reliability even under high temperature conditions, not just under room temperature conditions.

[Patent Reference 1] Japanese Published Unexamined Patent Application No. 2002-141042

DISCLOSURE OF THE INVENTION

Problems to be Solved by the Invention

It has been found that the positive electrode of the battery with an elevated end-of-charge voltage loses the stability of the crystal structure and shows a considerable battery performance deterioration especially at high temperature. Although the details have not yet been clear, there are indications of decomposition products of the electrolyte solution and dissolved elements from the positive electrode active material (dissolved cobalt in the case of using lithium cobalt oxide) as far as we can see from the results of an analysis, and it is believed that these are the primary causes of the deteriorations in cycle performance and storage characteristics under high temperature conditions.

In particular, in the battery system that employs a positive electrode active material composed of lithium cobalt oxide, lithium manganese oxide, lithium-nickel-cobalt-manganese composite oxide, or the like, high temperature storage causes the following problems. When stored at high temperature, cobalt or manganese dissociates into ions and dissolves away from the positive electrode, and subsequently, these elements deposit on the negative electrode and the separator as they are reduced at the negative electrode.

This results in an increase in the battery internal resistance and the resulting capacity deterioration. Furthermore, when the end-of-charge voltage of the lithium-ion battery is raised as described above, the instability of the crystal structure is worsened, and the foregoing problems are exacerbated, so the foregoing phenomena tend to occur even at a temperature of about 50° C., where the battery rated at 4.2 V have not caused the problems. Moreover, these problems tend to worsen when a separator with a small film thickness and a low porosity is used.

For example, with a battery rated at 4.4 V that uses a lithium cobalt oxide positive electrode active material and a graphite negative electrode active material, a storage test (test conditions: end-of-charge voltage 4.4 V, storage temperature 60° C., storage duration 5 days) shows that the remaining capacity after the storage deteriorates considerably, in some cases as low as about zero. Following the disassembly of the tested battery, a large amount of cobalt was found in the negative electrode and the separator. Therefore, it is believed that the elemental cobalt that has dissolved away from the positive electrode accelerated the deterioration. The valency of the positive electrode active material that has a layered structure, such as lithium cobalt oxide, increases by the extraction of lithium ions. However, since tetravalent cobalt is unstable, the crystal structure thereof is unstable and tends to change into a more stable structure. This is believed to cause the cobalt ions to easily dissolve away from the crystals. It is also known that when a spinel-type lithium manganese oxide is used as the positive electrode active material as well, trivalent manganese becomes non-uniform, and dissolves away from the positive electrode as bivalent ions, causing the same problems as in the case of using lithium cobalt oxide as the positive electrode active material.

As described above, when the charged positive electrode active material has an unstable structure, the performance deterioration during storage and the cycle life degradation under high temperature conditions tend to be more evident. It is also known that this tendency is more evident when the filling density of the positive electrode active material layer is higher, so the problems are more serious in a battery with a high capacity design. It should be noted that even the physical properties of the separator, not just the negative electrode, are involved because, for example, by-products of the reactions produced from the positive and negative electrodes migrate through the separator to the opposite electrodes, further causing secondary reactions. Thus, it is believed that the ion mobility and migration distance within the separator are involved greatly.

To overcome such problems, attempts have been made to prevent cobalt or the like from dissolving away from the positive electrode by, for example, physically coating the surface of the positive electrode active material particles with an inorganic substance, or by chemically coating the surface of the positive electrode active material particles with an organic substance. However, in the case of the physical coating, since the positive electrode active material more or less expands and shrinks repeatedly during charge-discharge cycling, the advantageous effect resulting from the coating may be lost. On the other hand, in the case of the chemical coating, it is difficult to control the thickness of the coating film. If the thickness of the coating layer is too large, the internal resistance of the battery increases, making it difficult to attain desired performance, and as a result, the battery capacity reduces. Moreover, there remains an issue that it is difficult to coat the entire particle, limiting the advantageous effect resulting from the coating. Thus, there is a need for an alternative technique to the coating methods.

Accordingly, it is an object of the present invention to provide a non-aqueous electrolyte battery that shows good cycle performance and good storage performance under high temperature conditions, and exhibits high reliability even with a battery configuration featuring high capacity.

Means for Solving the Problems

In order to accomplish the foregoing and other objects, the present invention provides a non-aqueous electrolyte battery comprising: a positive electrode having a positive electrode active material layer containing a positive electrode active material; a negative electrode having a negative electrode active material layer containing a negative electrode active material layer; a separator interposed between the positive electrode and the negative electrode; an electrode assembly comprising the positive electrode, the negative electrode, and the separator; and a non-aqueous electrolyte impregnated in the electrode assembly, characterized in that: the positive electrode active material contains at least cobalt or manganese; and a coating layer is formed on a surface of the negative electrode active material layer, the coating layer comprising filler particles and a binder.

In the above-described configuration, the binder contained in the coating layer, which is disposed on the surface of the negative electrode active material layer, absorbs the electrolyte solution and expands, and as a result, the expanded binder fills up the gaps between the filler particles to an appropriate degree, enabling the coating layer containing the filler particles and the binder to exhibit an appropriate level of filtering function. Thus, the coating layer traps the decomposition product of the electrolyte solution resulting from the reaction at the positive electrode as well as the cobalt ions or manganese ions dissolved away from the positive electrode active material, preventing the cobalt or manganese from depositing on the negative electrode and the separator. This makes it possible to alleviate damages to the negative electrode and the separator. Therefore, the deterioration in the cycle performance under high temperature conditions and the deterioration in the storage performance under high temperature conditions can be lessened. In addition, in the present invention, the coating layer is formed on a surface of the negative electrode active material layer and cobalt ions, manganese ions, or the like may exist in the separator. Therefore, it may seem possible that they deposit at the separator. However, these ions are prevented from coming into contact with the negative electrode active material layer directly because of the presence of the coating layer, and therefore hindered from being reduced and deposited on the separator.

Moreover, the binder firmly bonds the filler particles to one another, as well as the coating layer to the negative electrode active material layer, preventing the coating layer from coming off from the negative electrode active material layer. Thus, the above-described advantageous effect is maintained for a long period.

It is desirable that the invention be applied to a battery in which the product of x and y, where x (μm) is the thickness of the separator and y (%) is the porosity of the separator, is 1500 (μm·%) or less, more desirably 800 (μm·%) or less.

The reason why the pore volume of the separator is restricted to 1500 (μm·%) or less, more desirably 800 (μm·%) or less, is as follows. A separator with a smaller pore volume is more susceptible to the adverse effects from the deposition product and the side reaction product and tends to show a more significant deterioration in battery performance. Thus, by applying the present invention to the battery having such a separator as described above, a more significant advantageous effect can be obtained.

It should be noted that such a battery may also achieve an improvement in the energy density because such a battery accomplishes a separator thickness reduction.

It is desirable that the filler particles comprise inorganic particles. In particular, it is desirable that the inorganic particles be made of a rutile-type titania and/or alumina.

The reason why the filler particles are restricted to inorganic particles, particularly to rutile-type titania and/or alumina, is that these materials show good stability within the battery (i.e., have low reactivity with lithium) and moreover they are low cost materials. The reason why the rutile-type titania is employed is as follows. The anatase-type titania is capable of insertion and deinsertion of lithium ions, and therefore it can absorb lithium and exhibit electron conductivity, depending on the surrounding atmosphere and or the potential, so there is a risk of capacity degradation and short circuiting.

However, since the type of the filler particles has very small impact on the advantageous effects of the invention, it is also possible to use, in addition to the above-mentioned substances, filler particles made of other substances such as zirconia and magnesia, and sub-micron particles made of an organic substance, such as polyimide, polyamide, or polyethylene.

It is desirable that the filler particles have an average particle size greater than the average pore size of the separator.

If the filler particles have an average particle size smaller than the average pore size of the separator, the separator may be pierced in some portions when winding and pressing the electrode assembly during the fabrication of the battery, and consequently the separator may be damaged considerably. Moreover, the filler particles may enter the pores of the separator and degrade various characteristics of the battery. To avoid such problems, the average particle size of the filler particles should be controlled as described above.

It is preferable that the filler particles have an average particle size of 1 µm or less. In addition, taking the dispersion capability of the slurry into consideration, it is preferable to use inorganic particles subjected to a surface treatment with aluminum, silicon, or titanium.

It is desirable that the coating layer be formed on an entire surface of the negative electrode active material layer.

With such a configuration, the coating layer provided on the surface of the negative electrode active material layer exhibits a filtering function to an appropriate degree. Thus, the coating layer traps the decomposition products of the electrolyte solution resulting from the reaction at the positive electrode as well as the cobalt or manganese ions dissolved away from the positive electrode active material, hindering the cobalt or manganese from depositing on the negative electrode and the separator. This makes it possible to further alleviate damages to the negative electrode and the separator. Therefore, the deterioration in the cycle performance under high temperature conditions and the deterioration in the storage performance under high temperature conditions can be lessened further. Moreover, even when the entire surface of the negative electrode active material layer is coated with the coating layer, the binder firmly bonds the filler particles to one another, as well as the coating layer to the negative electrode active material layer, preventing the coating layer from coming off from the negative electrode active material layer.

It is desirable that the thickness of the coating layer be from 1 µm to 4 µm, more desirably from 1 µm to 2 µm.

Although the above-described advantageous effects become more significant when the thickness of the coating layer is larger, an excessively large thickness of the coating layer is problematic. If the thickness of the coating layer is too large, load characteristics may degrade because of an increase in the internal resistance of the battery, and the battery energy density may also decrease because an excessively large thickness of the coating layer means less amounts of the active materials in the positive and negative electrodes. Although the advantageous effect is obtained even when the coating layer is thin, it is preferable that the layer not be too thin in order to obtain sufficient effects. It should be noted that the trapping effect is sufficiently obtained even when the thickness of the coating layer is small because the coating layer has a complicated, complex structure. It should be noted that the thickness of the above-mentioned coating layer means the thickness of the coating layer on one side.

It is desirable that the concentration of the binder be 30 mass % or less with respect to the filler particles.

The reason why the upper limit of the concentration of the binder with respect to the filler particles is set as described above is that if the concentration of the binder is too high, the mobility of lithium ions to the active material layer becomes extremely poor (hindering diffusion of the electrolyte) and the resistance between the electrodes increases, resulting in a poor charge-discharge capacity.

It is desirable that the positive electrode active material layer have a filling density of 3.40 g/cc or greater.

The reason is as follows. When the filling density is less than 3.40 g/cc, the reaction in the positive electrode takes place over the entire electrode, not locally. Therefore, the deterioration of the positive electrode also proceeds uniformly and does not significantly affect the charge-discharge reactions after storage. On the other hand, when the filling density is 3.40 g/cc or higher, the reaction in the positive electrode is limited to local reactions in the outermost surface layer, and the deterioration of the positive electrode also mainly takes place in the outermost surface layer. This means that the intrusion and diffusion of lithium ions into the positive electrode active material during discharge become the rate-determining processes, and therefore, the degree of the deterioration becomes large. Thus, the advantageous effects of the present invention are exhibited more significantly when the positive electrode active material layer has a filling density of 3.40 g/cc or greater.

It is desirable to employ a configuration in which the positive electrode is charged to 4.30 V or higher, more preferably 4.40 V or higher, and particularly preferably 4.45 V or higher, versus a lithium reference electrode potential.

The reason is as follows. The presence or absence of the coating layer does not make much difference in high temperature performance of a battery in which the positive electrode is configured to be charged to less than 4.30 V versus a lithium reference electrode potential, but the presence or absence of the coating layer leads to a significant difference in high temperature performance of a battery in which the positive electrode is charged to 4.30 V or higher versus a lithium reference electrode potential. In particular, this difference emerges especially noticeably in a battery in which the positive electrode is charged to 4.40 V or higher or to 4.45 V or higher.

It is desirable that the positive electrode active material contain lithium cobalt oxide containing aluminum or magnesium in solid solution, and zirconia is firmly adhered to the surface of the lithium cobalt oxide.

The reason for employing such a configuration is as follows. In the case of using lithium cobalt oxide as the positive electrode active material, as the charge depth increases, the crystal structure becomes more unstable and the deterioration accelerates in a high temperature atmosphere. In view of this problem, aluminum or magnesium is contained in the positive electrode active material (inside the crystals) in the form of solid solution so that crystal strain in the positive electrode can be alleviated. Although these elements serve to stabilize the crystal structure greatly, they may lead to poor initial charge-discharge efficiency and poor discharge working voltage. In order to alleviate this problem, zirconia is caused to adhere firmly to the surface of lithium cobalt oxide.

It is desirable that the positive electrode contain $Al_2O_3$.

When $Al_2O_3$ is contained in the positive electrode in this way, the catalytic property of the positive electrode active material can be alleviated. Thus, it becomes possible to impede the decomposition reaction of the electrolyte solution at the conductive carbon surface adhering to the positive electrode active material or between the electrolyte solution and the positive electrode active material. It is possible to perform a heat treatment after adding the $Al_2O_3$, but the treatment is not essential. Moreover, it is not necessary that $Al_2O_3$ be contained in the crystal of the lithium cobalt oxide in solid solution, unlike the case of the above-described aluminum.

It is preferable that $Al_2O_3$ be directly in contact with the positive electrode active material, but this is not essential. The advantageous effects can be exhibited with a configuration in which the $Al_2O_3$ is in contact with a conductive agent, when the conductive agent is contained in the positive electrode. It is preferable that the amount of the $Al_2O_3$ contained in the positive electrode be from 0.1 mass % to 5 mass % with respect to the total amount of the positive electrode active material (in particular, from 1 mass % to 5 mass %). If the amount is less than 0.1 mass %, the effect of adding $Al_2O_3$ cannot be fully exhibited, whereas if the amount exceeds 5 mass %, the relative amount of the positive electrode active material decreases, lowering the battery capacity.

It is desirable that the $Al_2O_3$ be added mechanically. An example of the method for coating the surface of the lithium cobalt oxide with $Al_2O_3$ is a sol-gel method, but the mechanical addition is industrially easier than the sol-gel method. Moreover, the mechanical addition does not require solvent, and therefore it is not necessary to take case of the reaction between the lithium cobalt oxide and the solvent.

It is desirable that the binder comprise a copolymer containing an acrylonitrile unit, or a polyacrylic acid derivative.

The reason is as follows. The copolymer containing an acrylonitrile unit and the like can fill the gaps between the filler particles by swelling after absorbing the electrolyte solution. Moreover they have high binding strength with the filler particles, and also they can ensure the dispersion capability of the filler particles sufficiently so as to prevent the re-aggregation of the filler particles. Furthermore, they have such a characteristic that they only dissolve into the non-aqueous electrolyte in a small amount. Therefore, they have sufficient functions required for the binder.

Further, it is preferable that the invention be applied to a battery that may be used in an atmosphere at 50° C. or higher.

The advantageous effects resulting from the present invention will be greater because the deterioration of the battery accelerates when used under an atmosphere at 50° C. or higher.

In order to accomplish the foregoing and other objects, the present invention also provides a non-aqueous electrolyte battery comprising: a positive electrode having a positive electrode active material layer containing a positive electrode active material; a negative electrode having a negative electrode active material layer containing a negative electrode active material; a separator interposed between the positive electrode and the negative electrode; an electrode assembly comprising the positive electrode, the negative electrode, and the separator; and a non-aqueous electrolyte comprising a solvent and a lithium salt, the non-aqueous electrolyte being impregnated in the electrode assembly, characterized in that: the positive electrode active material contains at least cobalt or manganese; a coating layer containing inorganic particles and a binder is formed on a surface of the negative electrode active material layer; the lithium salt comprises $LiBF_4$; and the positive electrode is charged to 4.40 V or higher versus a lithium reference electrode potential.

When the electrolyte solution contains $LiBF_4$ as described above, a surface film originating from the $LiBF_4$ is formed on the surface of the positive electrode active material, and the presence of the surface film serves to hinder dissolution of the substances constituting the positive electrode active material (such as cobalt ions or manganese ions) and decomposition of the electrolyte solution on the positive electrode surface. As a result, the cobalt ions, the manganese ions, or the decomposition products of the electrolyte solution are hindered from depositing on the negative electrode surface.

Nevertheless, it is difficult to cover the positive electrode active material completely with the surface film originating from $LiBF_4$, so it is difficult to prevent the dissolution of the substances constituting the positive electrode active material and the decomposition of the electrolyte solution on the positive electrode surface sufficiently. In view of this, the coating layer is formed on the surface of the negative electrode active material layer. Thereby, the cobalt ions etc. and the decomposition products are trapped by the coating layer, so it is possible to impede these substances from migrating to the separator and the negative electrode, causing deposition→reaction (deterioration), and causing the separator to be clogged. In other words, the coating layer exerts a filtering function, preventing the cobalt or the like from depositing on the negative electrode or the separator. Thereby, the storage performance in a charged state can be prevented from degrading to a sufficient degree.

It is believed that the coating layer exhibits the filtering function for the following reason. The binder contained in the coating layer absorbs the electrolyte solution and swells, and as a result, the swollen binder fills up the gaps between the inorganic particles to an appropriate degree. In addition, it is believed that a complicated and complex filter layer is formed since a plurality of inorganic particles is entangled in the formed layer, so the physical trapping effect is also enhanced.

In addition, the following is the reason why the positive electrode should be charged to 4.40 V or higher versus a lithium reference electrode potential. As described above, $LiBF_4$ has the advantage of forming a surface film on the positive electrode surface and thereby hindering, for example, dissolution substances from the positive electrode active material and decomposition of the electrolyte solution. Nevertheless, $LiBF_4$ has a drawback of reducing the concentration of the lithium salt and reducing the conductivity of the electrolyte solution because $LiBF_4$ is highly reactive with the positive electrode. As a result, when $LiBF_4$ is added even in the case that the positive electrode is charged to less than 4.40 V versus a lithium reference electrode potential (i.e., when the structure of the positive electrode is not under so much load), the just-mentioned drawback resulting from the addition of $LiBF_4$ is rather evident, and the battery performance becomes rather poor.

Moreover, the above-described configuration also has the effect of hindering the inorganic particles from being detached over a long period of time since the inorganic particles are firmly bonded to each other by the binder.

In the case of a battery in which $LiBF_4$ is not contained in the lithium salt and no coating layer is formed, a behavior was confirmed that the charge curve meanders at the time of recharge of the battery after storage and the amount of charge increases significantly when the positive electrode is charged to 4.40 V or higher versus a lithium reference electrode potential. However, it has been confirmed that the configuration according to the present invention has the effect of eliminating such an abnormal charge behavior.

It should be noted that although a prior art example in which $LiBF_4$ is added to the electrolyte solution has been disclosed (WO2006/54604), it will be clear from the foregoing discussion that merely adding $LiBF_4$ to the electrolyte solution does not achieve the advantageous effects of the present invention.

It is desirable that the coating layer be formed on an entire surface of the negative electrode active material layer.

Such a configuration makes it possible to exert the effect of trapping cobalt ions and manganese ions in the coating layer more sufficiently, so it is possible to lessen the deterioration in the cycle performance under high temperature conditions and the deterioration in the storage performance under high temperature conditions further.

It is desirable that the amount of the $LiBF_4$ be from 0.1 mass % to 5.0 mass % with respect to the total amount of the non-aqueous electrolyte.

If the amount of the $LiBF_4$ is less than 0.1 mass % with respect to the total amount of the non-aqueous electrolyte, the effect of improving the storage performance cannot be exhibited sufficiently because the amount of the $LiBF_4$ is too small. On the other hand, if the amount of the $LiBF_4$ exceeds 5.0 mass % with respect to the total amount of the non-aqueous electrolyte, the discharge capacity and deterioration of the discharge load characteristics deteriorate considerably because of side reactions of $LiBF_4$.

It is desirable that the lithium salt contain $LiPF_6$, and the concentration of the $LiPF_6$ be from 0.6 mole/liter to 2.0 mole/liter.

The $LiBF_4$ is consumed by the reactions during charge and discharge, so if the electrolyte is $LiBF_4$ alone, sufficient conductivity cannot be ensured and discharge load characteristics may be deteriorated. For this reason, it is desirable that the lithium salt contains $LiPF_6$. In addition, if the concentration of $LiPF_6$ is too low even when the lithium salt contains $LiPF_6$, the same problems as described above arise. Therefore, it is preferable that the concentration of $LiPF_6$ be 0.6 mole/liter or higher. It also should be noted if the concentration of $LiPF_6$ exceeds 2.0 mole/liter, the viscosity of the electrolyte solution becomes high, degrading circulation of the electrolyte solution in the battery.

It is desirable that the inorganic particles be made of a rutile-type titania and/or alumina.

The reason why it is preferable that the inorganic particles be made of a rutile-type titania and/or alumina is the same as described above.

Since the type of the inorganic particles has very small influence on the advantageous effects of the invention, other types of inorganic particles such as those composed of zirconia or magnesia as described above may also be used.

It is desirable that the inorganic particles have an average particle size greater than the average pore size of the separator.

The reason why such a restriction is made is the same as described above.

In addition, it is also preferable that the inorganic particles have an average particle size of 1 μm or less, and taking the dispersion capability of the slurry into consideration, it is preferable to use inorganic particles subjected to a surface treatment with aluminum, silicon, or titanium, as already described above.

It is desirable that the coating layer have a thickness of 4 μm or less.

The reason why such a range is preferable is the same as that discussed above. Likewise, it is also particularly desirable, as described above, that the coating layer have a thickness of 2 μm or less.

It should be noted here that the trapping effect is sufficiently obtained even when the thickness of the coating layer is small because the coating layer has a complicated, complex structure. The thickness of the coating layer may be made smaller without problems than in the case that the coating layer alone is provided (in the case that no $LiBF_4$ is added) because $LiBF_4$ is added to the electrolyte solution as described above and a surface film originating from the $LiBF_4$ is formed on the surface of the positive electrode active material, which hinders dissolution of the substances constituting the positive electrode active material (such as cobalt ions or manganese ions) and decomposition of the electrolyte solution on the positive electrode surface. Taking these things into consideration, it is sufficient that coating layer has a thickness of 1 μm or greater.

For the above reasons, it is desirable that the thickness of the coating layer be from 1 μm to 4 μm, more desirably from 1 μm to 2 μm. It should be noted that the thickness of the coating layer herein means the thickness of the coating layer on one side.

It is desirable that the concentration of the binder be 30 mass % or less with respect to the inorganic particles.

The upper limit is restricted to such a value for the same reason as described above.

It is desirable that the positive electrode active material layer have a filling density of 3.40 g/cc or greater.

The reason why such a restriction is made is the same as described above.

It is desirable to employ a configuration in which the positive electrode is charged to 4.45 V or higher, more preferably 4.50 V or higher, versus a lithium reference electrode potential.

The reason is that whether or not $LiBF_4$ is added and whether or not the coating layer is provided leads to a significant difference in high-temperature performance in the case of such a battery in which the positive electrode is charged at 4.45 V or higher versus a lithium reference electrode potential. In particular, this difference emerges especially noticeably in such a battery in which the positive electrode is charged to 4.50 V or higher.

It is desirable that the positive electrode active material contain lithium cobalt oxide containing aluminum or magnesium in solid solution, and zirconia is firmly adhered to the surface of the lithium cobalt oxide.

The reason why it is preferable to employ such a configuration is the same as that discussed above.

Further, it is preferable that the invention be applied to a battery that may be used in an atmosphere at 50° C. or higher.

The advantageous effects resulting from the present invention will be greater because the deterioration of the battery accelerates when used under an atmosphere at 50° C. or higher.

It is desirable that the invention be applied to a battery in which the product of separator thickness x (μm) and separator porosity y (%) is controlled to 800 (μm·%) or less.

The separator pore volume is controlled to 800 (μm·%) or less for the same reason as described above.

However, when the separator pore volume is 1500 (μm·%) or less, the above-described advantageous effects are exhibited sufficiently, and even when the separator pore volume is 1500 (μm·%) or greater, the advantageous effects may be exhibited.

It should be noted that a battery with a small separator pore volume may also achieve an improvement in battery energy density because such a battery can accomplish a separator thickness reduction.

In order to accomplish the foregoing and other objects, the present invention also provides a method of manufacturing a non-aqueous electrolyte battery, comprising the steps of: forming a coating layer on a surface of a negative electrode active material layer comprising a negative electrode active material, the coating layer comprising filler particles and a binder, to prepare a negative electrode; preparing an electrode assembly by interposing a separator between a positive electrode and the negative electrode, the positive electrode having a positive electrode active material containing at least cobalt or manganese; and impregnating the electrode assembly with a non-aqueous electrolyte.

The just-described method enables the manufacture of the above-described non-aqueous electrolyte battery.

It is preferable that, in the step of forming a coating layer on a surface of a negative electrode active material layer, the coating layer be formed by gravure coating or die coating.

The use of gravure coating or die coating enables intermittent coating, making it possible to minimize degradation of the energy density. In addition, such a method makes it possible to form a thin film layer with good accuracy by reducing the binder concentration in the slurry (reducing the concentration of the solid content as low as possible). Moreover, the solvent can be removed before the slurry component infiltrates into the negative electrode active material layer, so the internal resistance of the negative electrode is impeded from increasing.

It is desirable that in the step of forming a coating layer on the surface of the negative electrode active material layer, when the coating layer is formed by preparing a slurry by mixing the filler particles, the binder, and a solvent and then coating the slurry onto the surface of the negative electrode active material layer, the concentration of the binder should be controlled to be in the range of from 10 mass % to 30 mass % with respect to the filler particles if the concentration of the filler particles is in the range of from 1 mass % to 15 mass % with respect to the slurry.

In addition, in the step of forming a coating layer on the surface of the negative electrode active material layer, in the case that the coating layer is formed by preparing a slurry from a mixture of filler particles, a binder, and a solvent and coating the resultant slurry onto the surface of the negative electrode active material layer, it is desirable to control the concentration of the binder with respect to the filler particles to be in the range of from 1 mass % to 10 mass %, when the concentration of the filler particles with respect to the slurry exceeds 15 mass %.

Such an upper limit of the concentration of the binder with respect to the filler particles is determined for the same reason as described above. On the other hand, the lower limit of the concentration of the binder with respect to the filler particles is determined for the following reason. If the amount of binder is too small, the network made of the filler particles and the binder cannot be formed easily in the coating layer, so the trapping effect of the coating layer is lessened. In addition, the amount of the binder that can function between the filler particles and between the filler particles and the negative electrode active material layer will be too small, so peeling of the coating layer may occur.

The upper limit values and the lower limit values of the concentration of the binder with respect to the filler particles are different depending on the concentrations of the filler particles with respect to the slurry. This is because, even in the case that the concentration of the binder with respect to the filler particles is the same, the concentration of the binder per unit volume of the slurry is higher when the concentration of the filler particles with respect to the slurry is high than when the just-mentioned concentration is low.

Advantages of the Invention

According to the present invention, the coating layer provided on the surface of the negative electrode active material layer exhibits a filtering function to an appropriate degree. Thus, the coating layer traps the decomposition products of the electrolyte solution resulting from the reaction at the positive electrode as well as the cobalt or manganese ions dissolved away from the positive electrode active material, hindering the cobalt or manganese from depositing on the negative electrode and the separator. As a result, damages to the negative electrode and the separator are alleviated, and therefore, advantageous effects are obtained that the deterioration in cycle performance under high temperature conditions and the deterioration in storage performance under high temperature conditions can be lessened. Moreover, the binder firmly bonds the filler particles to one another as well as the coating layer to the negative electrode active material, preventing the coating layer from coming off from the negative electrode active material layer.

Moreover, according to the present invention, a surface film originating from $LiBF_4$ is formed on the surface of the positive electrode active material because $LiBF_4$ is added to the electrolyte solution. Therefore, the amounts of the decomposition products of the electrolyte solution resulting from the reaction at the positive electrode and the cobalt or manganese ions dissolved away from the positive electrode active material reduce. Furthermore, the coating layer provided between the negative electrode and the separator exhibits a filtering function to an appropriate degree. Thus, the decomposition products of the electrolyte solution resulting from the reaction at the positive electrode and the cobalt or manganese ions dissolved away from the positive electrode active material are trapped by the coating layer, so the cobalt or manganese is hindered from depositing on the negative electrode and the separator sufficiently. As a result, damages to the negative electrode and the separator are alleviated dramatically, and therefore, an excellent advantageous effect is exhibited that the deterioration in the cycle performance under high temperature conditions and the deterioration in the storage performance under high temperature conditions can be lessened. What is more, there is an advantageous effect that the coating layer can be prevented from coming off from the negative electrode active material layer since the binder firmly bonds the inorganic particles to each other as well as the coating layer to the negative electrode active material layer.

BEST MODE FOR CARRYING OUT THE INVENTION

Hereinbelow, the present invention is described in further detail based on preferred embodiments thereof. It should be construed, however, that the present invention is not limited to the following two embodiments, and various changes and modifications are possible without departing from the scope of the invention.

First Embodiment

[Preparation of Positive Electrode]

First, lithium cobalt oxide (in which 1.0 mol. % of Al and 1.0 mol. % of Mg are contained in the form of solid solution and 0.05 mol. % of Zr is firmly adhered to the surface) as a positive electrode active material, acetylene black as a carbon conductive agent, and PVDF as a binder agent were mixed together at a mass ratio of 95:2.5:2.5. Thereafter, the mixture was agitated together with NMP as a solvent, using a Combimix mixer made by Tokushu Kika Kogyo Co., Ltd., to thus prepare a positive electrode mixture slurry. Next, the resultant positive electrode mixture slurry was applied onto both sides of a positive electrode current collector made of an aluminum foil, and the resultant material was then dried and calendered, whereby a positive electrode was prepared in which positive electrode active material layers were formed on both surfaces of the aluminum foil. The filling density of the positive electrode active material layer was controlled to be 3.60 g/cc.

[Preparation of Negative Electrode]

A carbonaceous material (artificial graphite), CMC (carboxymethylcellulose sodium), and SBR (styrene-butadiene rubber) were mixed in an aqueous solution at a mass ratio of 98:1:1 to prepare a negative electrode slurry. Thereafter, the negative electrode slurry was applied onto both sides of a copper foil serving as a negative electrode current collector, and the resultant material was then dried and calendered. Thus, a negative electrode active material layer was formed on both sides of the negative electrode current collector. The filling density of the negative electrode active material layer was controlled to be 1.60 g/cc.

Next, an acetone solvent was mixed with 10 mass %, based on the mass of acetone, of $TiO_2$ particles (rutile-type, particle size 0.38 µm, KR380 manufactured by Titan Kogyo Co., Ltd.) serving as filler particles, and 10 mass %, based on the mass of $TiO_2$, of copolymer (elastic polymer) containing an acrylonitrile structure (unit), and a mixing and dispersing process was carried out using a Filmics mixer made by Tokushu Kika Kogyo Co., Ltd. Thereby, a slurry in which $TiO_2$ was dispersed was prepared. Next, the resultant slurry was coated over the entire surface of one side of the negative electrode active material layer by die coating, and then the solvent was removed by drying, whereby a coating layer was formed on one side of the negative electrode active material layer. Subsequently, a coating layer was formed over the entire surface of the other side of the negative electrode active material layer in a similar manner. Thus, a negative electrode was prepared. The thickness of the coating layer on both sides was 4 µm (2 µm per one side).

[Preparation of Non-aqueous Electrolyte]

A lithium salt composed of $LiPF_6$ was dissolved at a concentration of 1.0 mole/L in a mixed solvent of 3:7 volume ratio of ethylene carbonate (EC) and diethyl carbonate (DEC) to prepare a non-aqueous electrolyte.

[Type of Separator]

A polyethylene (hereinafter also abbreviated as "PE") microporous film (film thickness: 18 µm, average pore size 0.6 µm, and porosity 45%) was used as the separator.

[Construction of Battery]

Respective lead terminals were attached to the positive and negative electrodes, and the positive and negative electrodes were wound in a spiral form with a separator interposed therebetween. The wound electrodes were then pressed into a flat shape to obtain an electrode assembly, and the prepared electrode assembly was placed into a space made by an aluminum laminate film serving as a battery case. Then, the non-aqueous electrolyte was filled into the space, and thereafter the battery case was sealed by welding the aluminum laminate film together, to thus prepare a battery. In this battery design, the end-of-charge voltage was controlled to be 4.40 V by adjusting the amounts of the active materials in the positive and negative electrodes, and moreover, the capacity ratio of the positive and negative electrodes (initial charge capacity of the negative electrode/initial charge capacity of the positive electrode) was controlled to be 1.08 at that potential. The above-described battery had a design capacity of 780 mAh.

Second Embodiment

A battery was fabricated in the same manner as in described in the first embodiment above, except that a non-aqueous electrolyte solution prepared in the following manner was used as the non-aqueous electrolyte solution and that a separator prepared in the following manner was used as the separator.

[Preparation of Non-aqueous Electrolyte]

$LiPF_6$ and $LiBF_4$ were dissolved at a proportion of 1.0 mole/liter (M) and at a proportion of 1 mass %, respectively, in a mixed solvent of 3:7 volume ratio of ethylene carbonate (EC) and diethyl carbonate (DEC) to prepare a non-aqueous electrolyte.

[Type of Separator]

A polyethylene microporous film (film thickness: 16 µm, average pore size: 0.1 µm, porosity: 47%) was used as the separator.

Embodiments

Preliminary Experiment 1

What type of binder and what type of dispersion process should be used to obtain good dispersion capability of the slurry were investigated by varying the type of binder and the method of dispersion processes used for preparing the coating layer of the separator. The results are shown in Table 1.

(Binders Used and Methods of Dispersion Process)

[1] Binders Used

Three types of binders were used, namely, PVDF (KF1100 made by Kureha Corp., one commonly used for a positive electrode for lithium-ion battery, hereinafter also abbreviated as PVDF for positive electrode), PVDF for gel polymer electrolyte (PVDF-HFP-PTFE copolymer, hereinafter also abbreviated as PVDF for gel polymer electrolyte), and elastic polymer containing an acrylonitrile unit.

[2] Methods of Dispersion Process

A dispersion process with a disperser (30 minutes at 3000 rpm), a dispersion process using a Filmics mixer made by Tokushu Kika Kogyo Co., Ltd. (30 seconds at 40 m/min.) and a bead mill dispersion process (10 minutes at 1500 rpm) were used. For reference, unprocessed subjects were also tested.

(Specific Details of the Experiment)

The above-described methods of dispersion process were used while varying types and concentrations of the binder, to determine precipitation conditions of the filler particles (titanium oxide [$TiO_2$] particles herein) after an elapse of one day.

TABLE 1

| Binder | | Method of dispersion | | | |
|---|---|---|---|---|---|
| Type | Amount (mass %) | Disperser | Filmics | Bead mill | Un-processed |
| PVDF for positive electrode | 1 | x | x | x | x |
| | 3 | x | OK | OK | x |
| | 5 | x | OK | OK | x |
| | 10 | x | OK | OK | x |
| PVDF for gel electrolyte | 1 | x | x | x | x |
| | 3 | x | OK | OK | x |
| | 5 | x | OK | OK | x |
| | 10 | x | OK | OK | x |
| Elastic polymer containing acrylonitrile unit | 1 | x | OK | OK | x |
| | 3 | x | OK | OK | x |
| | 5 | OK | OK | OK | x |
| | 10 | OK | OK | OK | x |

Note:
"OK" means that no precipitation was observed, and "x" means that precipitation was observed.

(Results of the Experiment)

[1] Results of the Experiment Concerning Types of Binders

As clearly seen from Table 1, it was observed that both the PVDFs (PVDF for positive electrode and PVDF for gel polymer electrolyte) tend to precipitate more easily than the elastic polymer containing an acrylonitrile unit, although both the PVDFs have such a tendency that they are less prone to precipitate as the amount of the PVDF added is greater. Therefore, it is preferable to use the elastic polymer containing an acrylonitrile unit as the binder. The reasons are as follows.

In order to obtain the advantageous effects of the present invention, it is preferable to form a coating layer as dense as possible. In that sense, it is preferable to use filler particles with sizes of sub-microns or smaller. However, filler particles tend to aggregate easily depending on the particle size, so it is necessary to prevent reaggregation after the particles are disentangled (dispersed).

On the other hand, the binder requires the following functions or properties in order to obtain the advantageous effects.

(I) The function to ensure the binding capability for withstanding the manufacturing process of the battery
(II) The function to fill the gaps between the filler particles by swelling after absorbing the electrolyte solution
(III) The function to ensure the dispersion capability of the filler particles (function of reaggregation prevention)
(IV) The characteristics of causing little dissolution into the electrolyte solution Here, the inorganic particles made of such substances as titania and alumina, used as the filler particles, have a high affinity with the binders that have acrylonitrile-based molecular structures, and the binders having these types of groups (molecular structures) show higher dispersion capability. Accordingly, it is desirable to adopt a binder agent (copolymer) containing acrylonitrile units, which can exhibit the above-mentioned functions (I) and (II) even when added in a small amount, and which has the characteristics (IV) and also satisfies the function (III). Furthermore, an elastic polymer is preferable to obtain flexibility after bonded to the negative electrode active material layer (to ensure the strength such that it does not break easily). From the foregoing, it is most preferable that the binder be an elastic polymer containing an acrylonitrile unit.

(2) Results of the Experiment Concerning Methods of Dispersion

As clearly seen from Table 1, it is observed that, when conducting disentanglement (dispersion) of particles on the order of submicrons, the dispersion process with a disperser causes precipitation in most of the cases, but the disentanglement (dispersion) methods such as the Filmics process and the bead mill process (the dispersion methods commonly used in the field of paint) do not cause precipitation in most of the cases. In particular, it is desirable to employ the dispersion process methods such as the Filmics process and the bead mill process, taking into consideration that it is extremely important to ensure the dispersion capability of the slurry in order to carry out uniform coating of the negative electrode active material layer. Although not shown in Table 1, it has been confirmed that the dispersion by an ultrasonic method cannot achieve sufficient dispersion performance.

Preliminary Experiment 2

What kind of coating method is desirable for forming the coating layer was investigated by coating the slurry onto the negative electrode active material layer with various methods of coating.

(Coating Methods Used)

Dip coating, gravure coating, die coating, and transfer coating were used to coat the slurry on both sides of the negative electrode active material layer.

(Results of the Experiment)

A method that can implement intermittent coating is desirable in order to maximize the effect of the present invention and at the same time minimize deterioration of the energy density. Among the above-mentioned coating methods, the dip coating cannot perform intermittent coating easily. Therefore, it is desirable to adopt gravure coating, die coating, transfer coating, or spray coating as the coating method.

The filler particle-containing slurry to be coated has relatively good heat resistance, so the conditions for the removal of solvent, such as drying temperature, are not particularly limited. Nevertheless, the binder and solvent contained in the slurry infiltrates into the negative electrode active material layer, and may have considerable adverse effects such as an increase in plate resistance resulting from an increase of binder concentration and damages to the negative electrode (deterioration in the bonding strength of the negative electrode active material layer that results from melting of the binder used for forming the negative electrode active material layer). These problems may be avoided by increasing the concentration of the solid content in the slurry (slurry viscosity increases), but this is not practical since the coating itself becomes difficult. For this reason, it is desirable that, as the method of coating, a situation in which a thin film can be coated easily should be created by reducing the binder concentration in the slurry so that the concentration of the solid content can be decreased as low as possible, and further, removal of the solvent can be performed before the slurry component infiltrates toward the interior of the negative electrode active material layer. Taking these things into consideration, gravure coating and die coating are particularly desirable. In addition, these methods exhibit the advantage that they can form a thin film layer with good accuracy.

The solvent for dispersing the filler particles may be NMP, which is commonly used for batteries, but considering the foregoing, ones having high volatility are particularly preferable. Examples of such a solvent include water, acetone, and cyclohexane.

Preliminary Experiment 3

The pore size of the separator was varied to find out what particle size of the filler particles (titanium oxide [$TiO_2$] particles herein) is desirable in the slurry when forming the coating layer. The results are shown in Table 2. For reference, Table 2 also shows the results for the one in which no coating layer was formed.
(Separators Used)
Separators with average pore sizes of 0.1 μm and 0.6 μm were used.
(Specific Details of the Experiment)
A separator was disposed between a positive electrode and the negative electrode having the coating layer, and these were wound together. Thereafter, a cross section of the separator was observed by SEM. The average particle size of the titanium oxide particles in the slurry was 0.38 μm.

In addition, a withstanding voltage test was also conducted as follows. Actual laminate type batteries were fabricated (but no non-aqueous electrolyte solution was filled therein), and a voltage of 200 V was applied to the batteries to confirm whether or not short circuits occurred in the batteries.
(Results of the Experiment)

TABLE 2

| Sepratator average pore size | | 0.1 μm | 0.6 μm |
| --- | --- | --- | --- |
| Coating layer | Yes | 0/10 | 1/10 |
|  | No | 0/10 | 0/10 |

A cross-section of each of the separators was observed by SEM. As a result, it was confirmed that, in the one in which the average particle size of the filler particles is less than the average pore size of the separator (the one in which the separator has an average pore size of 0.6 μm), a substantial amount of the filler particles entered from the surface into the interior of the separator because of the factor believed to be the filler particles that peeled off from the coating layer during a process stage of the manufacturing. In contrast, in the ones in which the average particle size of the filler particles is greater than the average pore size of the separator (the ones in which the separator has an average pore size of 0.1 μm), almost no entry of the filler particles in the separator was observed.

In addition, as clearly seen from Table 2, the results of the withstanding voltage test revealed that the samples in which the average particle size of the filler particles was less than the average pore size of the separator tend to show a higher defect rate than that in which no coating layer was formed, whereas the samples in which the average particle size of the filler particles was greater than the average pore size of the separator showed the same level of defective rate (no defects) as those in which no coating layer was formed. The reason is believed to be as follows. In the former case, the separator is partially pierced during the winding and pressing or due to the effect of the winding tension, and a portion with a low resistance is formed partially. In the latter case, almost no filler particles enter the interior of the separator, so the separator is prevented from being pierced. In the preliminary experiment 3, the experiment was conducted using laminate batteries, but in the cases of cylindrical batteries and prismatic batteries, winding tension and the conditions of winding and pressing are more severe, so it is believed that such phenomenon is more apt to occur.

From the foregoing, it will be understood that it is desirable that the average particle size of the filler particles be greater than the average pore size of the separator, particularly in the cases of cylindrical batteries and prismatic batteries.

The values of average particle size of the filler particles were measured by a particle size distribution method.

Preliminary Experiment 4

An air permeability measurement test was conducted to study how much difference in the air permeability of the separator would be made depending on the type of separator.
(Separators Used)
In this experiment, various separators (each composed of a microporous film made of PE) were used having various pore diameters, film thicknesses, and porosities.
(Specific Details of the Experiment)
[1] Measurement of Separator Porosity
Prior to the measurement of the separators as described below, the porosity of each separator was measured in the following manner.

First, a sample of the film (separator) was cut into a 10 cm×10 cm square, and the mass (W g) and the thickness (D cm) of the sample were measured. The mass of each of the materials within the sample was determined by calculation, and the mass of each of the materials [Wi (i=1 to n)] was divided by the absolute specific gravity, to assume the volume of each of the materials. Then, porosity (volume %) was determined using the following equation 1.

Porosity (%)=100−{($W1$/Absolute specific gravity 1)+($W2$/Absolute specific gravity 2)+ . . . +($Wn$/Absolute specific gravity $n$)}×100/(100$D$)　　(1)

The separator in the present specification, however, is made of PE alone, and therefore, the porosity thereof can be determined using the following equation (2).

Porosity (%)=100−{(Mass of $PE$/Absolute specific gravity of $PE$)}×100/(100$D$)　　(2)

[2] Measurement of Air Permeability of Separators
This measurement was carried out according to JIS P8117, and the measurement equipment used was a B-type Gurley densometer (made by Toyo Seiki Seisaku-sho, Ltd.).

Specifically, a sample was fastened to a circular hole (diameter: 28.6 mm, area: 645 mm$^2$) of the inner cylinder (mass: 567 g), and the air (100 cc) in the outer cylinder was passed through the circular hole of the test cylinder to the outside of the cylinder. The time it took for the air (100 cc) in the outer cylinder to pass through the separator was measured, and the value obtained was employed as the air permeability of the sample.

(Results of the Experiment)

TABLE 3

| Type of separator | Separator | | | Air | Batteries applied |
| | Average pore size (μm) | Film thickness (μm) | Porosity (%) | permeability [air] (s/100 cc) | |
| --- | --- | --- | --- | --- | --- |
| Separator S1 | 0.6 | 18 | 45 | 110 | A1, C1 to C11, E, Comp. Z1, Y1, Y3, Y5, Y7, W |
| Separator S2 | 0.1 | 12 | 38 | 290 | A2, D1 Comp. Z2, Y2, Y4, Y6, Y8, X1 to X3 |
| Separator S3 | 0.1 | 16 | 47 | 190 | F1 to F3, G1, G2, Comp. Z3, V1 to V5, U1 to U10 |
| Separator S4 | 0.05 | 20 | 38 | 500 | Comp. Z4 |
| Separator S5 | 0.6 | 23 | 48 | 85 | Comp. Z5 |
| Separator S6 | 0.6 | 27 | 52 | 90 | Comp. Z6 |

As will be clearly understood from reviewing Table 3, when the average pore diameter of the separator is small, the air permeability tends to be poor (see, for example, the results for the separators S2 to S4). It should be noted, however, that a separator with a large porosity can prevent the air permeability from becoming poor, even when the separator has a small average pore diameter (compare separator S2 and separator S3). Moreover, it will also be recognized that when the film thickness of the separator is large, the air permeability tends to be poor (compare separator S5 and separator S6).

Preliminary Experiment 5

As has been discussed in the Background of the Invention, although the use of lithium cobalt oxide as the positive electrode active material is preferable in order to achieve a battery with a higher capacity, problems also exist. In order to resolve or alleviate the problems, various elements were added to lithium cobalt oxide to find what kind of element is suitable.
(Preconditions in Selecting Additive Element)

Prior to selecting additive elements, the crystal structure of lithium cobalt oxide was analyzed. The result is shown in FIG. 1 [reference: T. Ozuku et. al, J. Electrochem. Soc. Vol. 141, 2972 (1994)].

As will be clearly seen from reviewing FIG. 1, it has been found that the crystal structure (particularly the crystal structure along the c-axis) is greatly disintegrated when the positive electrode is charged to about 4.5 V or higher versus a lithium reference electrode potential (i.e., charged to a battery voltage of 4.4 V or higher, since the battery voltage is about 0.1 V lower than the potential of the lithium reference electrode). Thus, it has been observed that the crystal structure of lithium cobalt oxide becomes more unstable as the charge depth increases. Moreover, it has also been found that the deterioration of the lithium cobalt oxide accelerates when exposed in a high temperature atmosphere.
(Details of Selection of Additive Elements)

As a result of assiduous studies, we have found that, in order to alleviate the disintegration of the crystal structure, it is very effective to cause Mg or Al to dissolve in the interior of the crystal to form a solid solution. In this respect, both Mg and Al are effective almost to the same degree, but Mg has less adverse effects on later-described other battery characteristics. For this reason, it is more preferable that Mg is dissolved in the form of solid solution.

Although these elements contribute to the stabilization of the crystal structure, they may bring about degradation in the initial charge-discharge efficiency and a decrease in the discharge working voltage. For the purpose of alleviating these problems, the present inventors conducted experiments assiduously and as a result found that the discharge working voltage is significantly improved by adding a tetravalent or pentavalent element, such as Zr, Sn, Ti, or Nb, to lithium cobalt oxide. An analysis was conducted for lithium cobalt oxides to which a tetravalent or pentavalent element was added, and it was found that such an element existed on the surfaces of the lithium cobalt oxide particles, and basically, they did not form a solid solution with lithium cobalt oxide, but was kept in the state of being in direct contact with the lithium cobalt oxide. Although the details are not yet clear, it is believed that these elements serve to significantly reduce the interface charge transfer resistance, i.e., the resistance in the interface between the lithium cobalt oxide and the electrolyte solution, and that this contributes to the improvement in the discharge working voltage.

However, in order to ensure the state in which the lithium cobalt oxide and the additive element are directly in contact with each other, it is necessary to sinter the material after the additive element material is add. In this case, among the above-mentioned elements, Sn, Ti, and Nb usually serve to inhibit crystal growth of the lithium cobalt oxide and therefore tend to lower the safety of the lithium cobalt oxide itself (when the crystallite size is small, the safety tends to be poor). On the other hand, Zr was found to be advantageous in that it does not impede crystal growth of the lithium cobalt oxide and moreover it improves the discharge working voltage.

Thus, it was found preferable that when using lithium cobalt oxide at 4.3 V or higher, particularly at 4.4 V or higher versus the potential of a lithium reference electrode, Al or Mg should be dissolved in the interior of the crystal of the lithium cobalt oxide in order to stabilize the crystal structure of the lithium cobalt oxide, and at the same time, Zr should be firmly adhered to the surfaces of the lithium cobalt oxide particles in order to compensate the performance degradation resulting from dissolving Al or Mg in the lithium cobalt oxide to form a solid solution.

It should be noted that the proportions of Al, Mg, and Zr to be added are not particularly limited.
[Preconditions for the Later-described Experiments (Operating Environment)]

As previously discussed in the Background of the Invention, mobile devices have required higher capacity and higher power batteries in recent years. In particular, mobile telephones tend to increase in power consumption because more advanced functions are required, such as full color images, moving pictures, and gaming. Currently, with a greater number of functions provided for such advanced mobile telephones, it has been desired that batteries used as the power source for the mobile telephones should have a higher capacity. Nevertheless, the improvements in battery performance have not reached that far, so the users are often compelled to use the mobile phones for watching TV programs or playing video games while charging the batteries simultaneously. Under such circumstances, the batteries are used constantly in a fully charged state, and also a high power is consumed. Consequently, the use environment often results in a temperature of 50° C. to 60° C.

In this way, the use environment for the mobile telephones have changed greatly along with the technological advancements of the mobile telephones, from the environment with only voice calls and electronic mails to the one with moving pictures and video games, and accordingly, the batteries have been demanded to guarantee a wide operating temperature range from room temperature to about 50-60° C. Also, increasing the capacity and raising the output power particularly accompany a large amount of heat generated in the interior of the battery, and the operating environment of the battery also tends to be in a high temperature range, so it is necessary to ensure the battery reliability under high temperature conditions.

In view of these circumstances, we have devoted a great deal of effort to improvements in the battery performance as determined by the cycle test under environments at 40° C. to 60° C. and the storage test under a 60° C. atmosphere. More specifically, conventional storage tests have had the implications of an accelerated test for the storage at room temperature; however, as the capabilities of the materials have been utilized to their limits as a result of the advancements in battery performance, the implications of the accelerated test for the storage at room temperature have gradually faded, and the emphasis of the tests has shifted to a durability test close to the real use level. In view of these situations, we have decided to study the differences between the present invention and the conventional technology in storage tests in a charged state (a storage test at 80° C. for 4 days for the batteries designed to have an end-of-charge voltage of 4.2 V, and a storage test at 60° C. for 5 days for the batteries designed to have a higher end-of-charge voltage, since the higher the end-of-charge voltage of the fabricated battery is, the more severe the conditions of the deterioration).

In the following description, examples of the present invention are categorized into 7 groups so that the advantageous effects of the invention can be readily understood. In the following, the First Group of Examples through the Fifth Group of Examples relate to the first embodiment, and the Sixth Group of Examples through the Seventh Group of Examples relate to the second embodiment, so they are discussed separately.

A. Examples Related to the First Embodiment

First Group of Examples

The relationship between the physical properties of separator and the storage performance in a charged state was investigated by using various separators, while the end-of-charge voltage and the filling density of the positive electrode active material layer were fixed at 4.40 V and 3.60 g/cc, respectively, and the physical properties of the coating layer formed on the surface of the negative electrode active material layer (the type of filler particles, the binder concentration, and the thickness of the coating layer) were also fixed. The results are set forth below.

(Example 1)

A battery prepared in the manner described in the first embodiment was used for Example 1.

The battery fabricated in this manner is hereinafter referred to as Battery A1 of the invention.

(Example 2)

A battery was fabricated in the same manner as described in Example 1 above, except that a separator having an average pore diameter of 0.1 µm, a film thickness of 12 µm, and a porosity of 38% was used as the separator.

The battery fabricated in this manner is hereinafter referred to as Battery A2 of the invention.

(Comparative Example 1)

A battery was fabricated in the same manner as described in Example 1 above, except that no coating layer was provided on the negative electrode.

The battery fabricated in this manner is hereinafter referred to as Comparative Battery Z1.

(Comparative Example 2)

A battery was fabricated in the same manner as described in Comparative Example 1 above, except that a separator having an average pore size of 0.1 µm, a film thickness of 12 µm, and a porosity of 38% was used as the separator.

The battery fabricated in this manner is hereinafter referred to as Comparative Battery Z2.

(Comparative Example 3)

A battery was fabricated in the same manner as described in Comparative Example 1 above, except that a separator having an average pore size of 0.1 µm, a film thickness of 16 µm, and a porosity of 47% was used as the separator.

The battery fabricated in this manner is hereinafter referred to as Comparative Battery Z3.

(Comparative Example 4)

A battery was fabricated in the same manner as described in Comparative Example 1 above, except that a separator having an average pore size of 0.05 µm, a film thickness of 20 µm, and a porosity of 38% was used as the separator.

The battery fabricated in this manner is hereinafter referred to as Comparative Battery Z4.

(Comparative Example 5)

A battery was fabricated in the same manner as described in Comparative Example 1 above, except that a separator having an average pore size of 0.6 µm, a film thickness of 23 µm, and a porosity of 48% was used as the separator.

The battery fabricated in this manner is hereinafter referred to as Comparative Battery Z5.

(Comparative Example 6)

A battery was fabricated in the same manner as described in Comparative Example 1 above, except that a separator having an average pore size of 0.6 µm, a film thickness of 27 µm, and a porosity of 52% was used as the separator.

The battery fabricated in this manner is hereinafter referred to as Comparative Battery Z6.

(Experiment)

The storage performance in a charged state (the remaining capacity after storage in a charged state) was determined for each of Batteries A1 and A2 of the invention and Comparative Batteries Z1 to Z6. The results are shown in Table 4 below. Based on the results obtained, correlation between the physical properties of the separator and the remaining capacity after storage in a charged state was also studied.

The results are shown in FIG. 2. The charge-discharge conditions and storage conditions were as follows.

[Charge-discharge Conditions]

Charge Conditions

Each of the batteries was charged at a constant current of 1.0It (750 mA) until the battery voltage reached a predetermined voltage (i.e., the designed voltage of the battery, 4.40 V for all the batteries in the present experiment), and thereafter charged at the predetermined voltage until the current value reached 1/20 It (37.5 mA).

Discharge Conditions

Each of the batteries was discharged at a constant current of 1.0 It (750 mA) until the battery voltage reached 2.75 V.

The interval between the charge and the discharge was 10 minutes.

[Storage Conditions]

Each of the batteries was charged and discharged one time according to the above-described charge-discharge conditions, and was again charged according to the charge conditions specified above to the predetermined voltage. Then, each of the charged batteries was set aside at 60° C. for 5 days.

[Determination of Remaining Capacity]

Each of the batteries was cooled to room temperature and discharged under the same conditions as the above-described discharge conditions, to measure the remaining capacity. Using the discharge capacity obtained at the first time discharge after the storage test and the discharge capacity obtained before the storage test, the remaining capacity was calculated using the following equation (3).

Remaining capacity (%)=Discharge capacity obtained at the first-time discharge after storage test/Discharge capacity obtained before storage test×100. (3)

TABLE 4

| Battery (Separator) | Separator | | | | | Negative electrode coating layer |
|---|---|---|---|---|---|---|
| | Average pore size (μm) | Film thickness (μm) | Porosity (%) | Pore volume [Film thickness × Porosity] (μm %) | Formation | Concentration of filler particles with respect to acetone (mass %) |
| A1 (S1) | 0.6 | 18 | 45 | 810 | Yes | 10 |
| A2 (S4) | 0.1 | 12 | 38 | 456 | | |
| Comp. Z1 (S1) | 0.6 | 18 | 45 | 810 | No | — |
| Comp. Z2 (S2) | 0.1 | 12 | 38 | 456 | | |
| Comp. Z3 (S3) | 0.1 | 16 | 47 | 752 | | |
| Comp. Z4 (S4) | 0.05 | 20 | 38 | 760 | | |
| Comp. Z5 (S5) | 0.6 | 23 | 48 | 1104 | | |
| Comp. Z6 (S6) | 0.6 | 27 | 52 | 1404 | | |

| Battery (Separator) | Negative electrode coating layer | | | | |
|---|---|---|---|---|---|
| | Concentration of binder with respect to filler particles (mass %) | Thickness [both sides] (μm) | Filling density of positive electrode active material layer (g/cc) | End-of-charge voltage (Positive electrode potential versus lithium reference electrode potential) (V) | Remaining capacity (%) |
| A1 (S1) | 10 | 4 | 3.60 | 4.40 | 67.4 |
| A2 (S4) | | | | (4.50) | 68.9 |
| Comp. Z1 (S1) | — | — | | | 45.5 |
| Comp. Z2 (S2) | | | | | 0.1 |
| Comp. Z3 (S3) | | | | | 12.2 |
| Comp. Z4 (S4) | | | | | 30.2 |
| Comp. Z5 (S5) | | | | | 47.3 |
| Comp. Z6 (S6) | | | | | 50.2 |

[Analysis]

(1) Analysis on the Advantage of the Provision of the Coating Layer

As clearly seen from the results shown in Table 4, although in all the batteries the design voltage is 4.40 V and the positive electrode active material layer has a filling density of 3.60 g/cc, Batteries A1 and A2 of the invention, in which the coating layer is formed on the surface of the negative electrode active material layer, prove to show significant improvements in remaining capacity over Comparative Batteries Z1 to Z6. The reason why such results were obtained will be detailed below.

There are possible causes of the deterioration in storage performance in a charged state, but taking into consideration that the positive electrode active material is used up to about 4.5 V versus the lithium reference electrode (the battery voltage is 0.1 V lower than that, i.e., about 4.4 V), the primary causes are believed to be as follows.
(I) The decomposition of the electrolyte solution in a strong oxidizing atmosphere due to the higher charge potential of the positive electrode.
(II) The deterioration due to the structure of the charged positive electrode active material that becomes unstable.

Not only do these factors bring about the deteriorations of the positive electrode and the electrolyte solution but also affect the clogging of the separator and the deterioration of the negative electrode active material that result from the deposit on the negative electrode, particularly because of the decomposition product of the electrolyte solution and the dissolution of the elements from the positive electrode active material, which are believed to be due to the above (I) and (II). Although the details will be discussed later, the latter effect, the adverse effect on the separator and the negative electrode is believed to be significant, taking the present results into consideration.

In particular, in the batteries using a separator with a small pore volume (Comparative Batteries Z2 and Z3), it is believed that the separator performance considerably deteriorates when these side reaction products cause clogging even in small amounts, and moreover, the amount and rate of transfer of these reaction products from the positive electrode to the negative electrode are faster and greater. As a consequence, the degree of deterioration was greater. Accordingly, the degree of deterioration of the battery is believed to be dependent on the separator pore volume.

In Batteries A1 and A2 of the invention, each having a negative electrode provided with the coating layer, the storage performance in a charged state improved. The reason is believed to be as follows. The decomposition products of the electrolyte solution and the Co or the like that has dissolved away from the positive electrode are trapped by the coating layer, which impedes the decomposition products and like from migrating to the separator and the negative electrode, causing deposition→reaction (deterioration), and clogging the separator. In other words, the coating layer exhibits a filtering function.

Many of binders for the coating layer expand about two times in volume after the electrolyte solution is filled, although it does not adversely affect the air permeability at the time of preparing the separator, so the gaps between the filler particles in the coating layer are filled up appropriately. This coating layer has a complicated, complex structure and the filler particles are firmly bonded to each other by the binder component. As a result, the strength is improved and the filtering effect can be exhibited sufficiently (i.e., the trapping effect becomes high since it has a complex structure even with a small thickness). The evaluation criteria for electrolyte solution absorbency is difficult to select, but it may be determined approximately by the time after dropping one drop of PC on the subject until the drop disappears.

Although the storage performance in a charged state may improve to a certain degree even when the filter layer is formed by a polymer layer only, the filtering effect will not be exhibited sufficiently unless the thickness of the polymer layer is sufficiently large, because the filtering effect in this case is dependent on the thickness of the polymer layer. Moreover, the filter capability weakens unless a completely non-porous structure is attained by the expansion of the polymer. Furthermore, the electrolyte solution permeability to the negative electrode becomes poor because the entire surface of the negative electrode is covered, so the adverse effects such as degradation in the load characteristics become greater. Therefore, in order to exert the filtering effect and at the same time minimize the adverse effects on other characteristics, it is more advantageous to form a coating layer (filter layer) containing filler particles (titanium oxide in the present example) rather than to form the filter layer by a polymer alone.

In view of the foregoing, the degree of deterioration is almost the same among the batteries provided with a negative electrode having the coating layer, irrespective of the type of the separator, and possible causes of the deterioration may be changes in quality of the electrolyte solution and damages to the positive electrode itself Evidence Showing that the Improvement in the Storage Performance in a Charged State Results from the Filtering Effect After completing the above-described test, the batteries were disassembled to observe the changes in color of the separators and the negative electrode surfaces. In the comparative batteries, in which no coating layer was formed, the separators discolored to a brownish color after storage in a charged state, and deposited substances were also observed on the negative electrodes. On the other hand, in the batteries of the invention, in which the coating layer was formed, neither discoloration nor deposited substance on the separator and the negative electrode surface was observed, but discoloration of the coating layer was observed. This result is believed to demonstrate that the reaction product at the positive electrode is hindered from migrating by the coating layer, whereby damages to the separator and the negative electrode are alleviated.

These reaction products are also likely to lead to cyclic side reactions such as self-discharge, in which the reaction products are reduced by migrating to the negative electrode and the subsequent reaction proceeds further. However, since the reaction products are trapped near the negative electrode, the cyclic reactions of the reaction products are hindered. In addition, it is possible that the reaction products themselves may serve the function similar to a surface film forming agent.

(2) Analysis on the Separators

As described above, Batteries A1 and A2 of the invention, which uses the negative electrode having the coating layer, achieve improvements in storage performance in a charged state, and when the film thickness of the separator is thinner, the degree of the improvement is greater. Moreover, when the pore volume of separator (film thickness x porosity), which is one of separator's physical properties and is affected greatly by the film thickness, is used as an indicator, it is understood that the advantageous effects of the present invention become evident at about 800 (μm·%) or less, as shown in FIG. 2.

Here, in Comparative Batteries Z1 to Z6, which use the negative electrode without the coating layer, the degree of deterioration during storage tends to be greater considerably when the film thickness of the separator is thinner, although the film thickness of the separator does not completely correlate with the degree of deterioration. Generally, the separator needs to have such a degree of strength that it can ensure the insulation capability in the battery and also it can withstand the processes during the fabrication of the battery. When the film thickness of the separator is reduced, the strength of the film (such as tensile strength and penetration resistance) is lowered although the energy density of the battery is improved; therefore, the average pore size of the micropores needs to be reduced, and consequently the porosity reduces. On the other hand, when the film thickness of the separator is greater, the strength of the film can be ensured to a certain degree, so the average pore size and porosity of the micropores may be selected relatively freely.

Nevertheless, as mentioned above, an increase in the film thickness of the separator directly results in a decrease in the energy density of the battery. Therefore, it is generally preferred that the porosity is increased by increasing the average pore size while keeping a certain degree of thickness (usually about 20 μm). When the coating layer is provided on the negative electrode while increasing the average pore size of the micropores, however, the defect rate of the battery tends to increase because of the entry of the filler particles in the micropores, as described above. Therefore, in reality, it is necessary to increase the porosity while at the same time reducing the pore size.

In view of these situations, we have conducted assiduous studies and found out that the separator usable in a battery employing the negative electrode provided with the coating layer must meet the following three requirements:

(I) it has a film thickness such that the energy density can be ensured;
(II) The micropores of the separator have an average pore size that enables reduction of the battery defects resulting from the entry of the filler particles that have come off from the coating layer formed on the negative electrode into the micropores; and
(III) the separator must have a porosity such that an appropriate separator strength can be ensured.

From the foregoing conditions, we have found that the pore volume of the separator that can be used in the present invention is 1500 (unit: μm. %) or less, as determined by the expression: Film thickness×Porosity.

(3) Conclusion

The foregoing results demonstrate that the storage performance in a charged state significantly improves in a 4.4 V battery having a negative electrode provided with the coating layer, irrespective of the material of the separator. In particular, the advantageous effect is remarkable when the pore volume (film thickness×porosity) of the separator is 1500 (unit: μm·%) or less, more preferably 800 (unit: μm·%) or less.

Second Group of Examples

The relationship between the end-of-charge voltage and the storage performance in a charged state was investigated by varying the end-of-charge voltage. Two types of separators (S1 and S2) were used, the filling density of the positive electrode active material layer was set at 3.60 g/cc, and the physical properties of the coating layer (the type of filler particles, the concentration of binder, and the thickness of the coating layer) formed on the surface of the negative electrode active material layer were fixed. The results are set forth below.

(Comparative Example 1)

A battery was fabricated in the same manner as described in Example 1 of the First Group of Examples, except that the battery was designed to have an end-of-charge voltage of 4.20 V and have a negative/positive electrode capacity ratio became 1.08 at that potential.

The battery fabricated in this manner is hereinafter referred to as Comparative Battery Y1.

(Comparative Example 2)

A battery was fabricated in the same manner as described in Example 2 of the First Group of Examples, except that the battery was designed to have an end-of-charge voltage of 4.20 V and have a negative/positive electrode capacity ratio became 1.08 at that potential.

The battery fabricated in this manner is hereinafter referred to as Comparative Battery Y2.

(Comparative Examples 3 and 4)

Batteries were fabricated in the same manner as described in Comparative Examples 1 to 2 above, except that no coating layer was formed on the negative electrode.

The batteries fabricated in these manners are hereinafter referred to as Comparative Batteries Y3 and Y4, respectively.

(Comparative Example 5)

A battery was fabricated in the same manner as described in Comparative Example 3 above, except that the battery was designed to have an end-of-charge voltage of 4.30 V and have a negative/positive electrode capacity ratio of 1.08 at that potential.

The battery fabricated in this manner is hereinafter referred to as Comparative Battery Y5.

(Comparative Example 6)

A battery was fabricated in the same manner as described in Comparative Example 4 above, except that the battery was designed to have an end-of-charge voltage of 4.30 V and have a negative/positive electrode capacity ratio of 1.08 at that potential.

The battery fabricated in this manner is hereinafter referred to as Comparative Battery Y6.

(Comparative Example 7)

A battery was fabricated in the same manner as described in Comparative Example 3 above, except that the battery was designed to have an end-of-charge voltage of 4.35 V and have a negative/positive electrode capacity ratio of 1.08 at that potential.

The battery fabricated in this manner is hereinafter referred to as Comparative Battery Y7.

(Comparative Example 8)

A battery was fabricated in the same manner as described in Comparative Example 4 above, except that the battery was designed to have an end-of-charge voltage of 4.35 V and have a negative/positive electrode capacity ratio of 1.08 at that potential.

The battery fabricated in this manner is hereinafter referred to as Comparative Battery Y8.

(Experiment)

The storage performance in a charged state (the remaining capacity after storage in a charged state) was determined for each of Batteries B1 and B2 of the invention and Comparative Batteries Y1 to Y8. The results are shown in Tables 5 and 6 below. The tables also show the results for Batteries A1 and A2 of the invention and Comparative Batteries Z1 and Z2.

In addition, as representative examples, the charge-discharge characteristics of Comparative Battery Z2 and Battery A2 of the invention were compared. The characteristics of the former are shown in FIG. 3, and those of the latter are shown in FIG. 4.

The charge-discharge conditions and storage conditions were as follows.

[Charge-discharge Conditions]

The charge-discharge conditions were the same as those in the experiment of the First Group of Examples.

[Storage Conditions]

Batteries A1, A2, and Comparative Batteries Z1, Z2, and Y5 to Y8 were set side under the same conditions as described in the experiment of the First Group of Examples. Comparative Batteries Y1 to Y4 were set aside at 80° C. for 4 days.

[Determination of Remaining Capacity]

The remaining capacities were calculated in the same manner as described in the experiment of the First Group of Examples.

TABLE 5

| Type of battery (Type of separator) | Separator | | | | Formation | Negative electrode coating layer | |
|---|---|---|---|---|---|---|---|
| | Average pore size (μm) | Film thickness (μm) | Porosity (%) | Pore volume [film thickness × porosity] (μm %) | | Concentration of filler particles with respect to acetone (mass %) | Concentration of binder with respect to filler particles (mass %) |
| Comp. Y1 (S1) | 0.6 | 18 | 45 | 810 | Yes | 10 | 10 |
| Comp. Y3 (S1) | | | | | No | — | — |
| Comp. Y2 (S2) | 0.1 | 12 | 38 | 456 | Yes | 10 | 10 |
| Comp. Y4 (S2) | | | | | No | — | — |
| Comp. Y5 (S1) | 0.6 | 18 | 45 | 810 | | — | — |
| Comp. Y6 (S2) | 0.1 | 12 | 38 | 456 | | — | — |

| Type of battery (Type of separator) | Negative electrode coating layer Thickness [Both sides] (μm) | Filling density of positive electrode active material layer (g/cc) | End-of-charge voltage(Positive electrode potential versus lithium reference electrode potential) (V) | Remaining capacity (%) | Abnormal charge behavior |
|---|---|---|---|---|---|
| Comp. Y1 (S1) | 4 | 3.60 | 4.20 (4.30) | 77.9 | Not observed |
| Comp. Y3 (S1) | — | | | 76.5 | |
| Comp. Y2 (S2) | 4 | | | 78.2 | |
| Comp. Y4 (S2) | — | | | 73.3 | |
| Comp. Y5 (S1) | — | | 4.30 (4.40) | 74.2 | |
| Comp. Y6 (S2) | — | | | 70.0 | Observed |

TABLE 6

| Type of battery (Type of separator) | Separator | | | | Formation | Negative electrode Coating layer | |
|---|---|---|---|---|---|---|---|
| | Average pore size (μm) | Film thickness (μm) | Porosity (%) | Pore volume [film thickness × porosity] (μm %) | | Concentration of filler particles with respect to acetone (mass %) | Concentration of binder with respect to filler particles (mass %) |
| Comp. Y7 (S1) | 0.6 | 18 | 45 | 810 | No | — | — |
| Comp. Y8 (S2) | 0.1 | 12 | 38 | 456 | | — | — |
| A1 (S1) | 0.6 | 18 | 45 | 810 | Yes | 10 | 10 |
| Comp. Z1 (S2) | | | | | No | — | — |
| A2 (S1) | 0.1 | 12 | 38 | 456 | Yes | 10 | 10 |
| Comp. Z2 (S2) | | | | | No | — | — |

TABLE 6-continued

| Type of battery (Type of separator) | Negative electrode Coating layer Thickness [Both sides] (μm) | Filling density of positive electrode active material layer (g/cc) | End-of-charge voltage(Positive electrode potential versus lithium reference electrode potential) (V) | Remaining capacity (%) | Abnormal charge behavior |
|---|---|---|---|---|---|
| Comp. Y7 (S1) | — | 3.60 | 4.35 (4.45) | 70.4 | Not observed |
| Comp. Y8 (S2) | — | | | 0.1 | Observed |
| A1 (S1) | 4 | | 4.40 (4.50) | 67.4 | Not observed |
| Comp. Z1 (S2) | — | | | 45.5 | Observed |
| A2 (S1) | 4 | | | 68.9 | Not observed |
| Comp. Z2 (S2) | — | | | 0.1 | Observed |

[Analysis]

As clearly seen from Tables 5 and 6, it is observed that in the storage test in a charged state, the Batteries of the invention, in which the coating layer is formed on the surface of negative electrode active material layer, exhibit significantly improved remaining capacities after storage in a charged state over the Comparative Batteries, in which no coating layer is formed, although the same types of separators are used (for example, when comparing Battery A1 of the invention and Comparative Battery Z1 and when comparing Battery A2 of the invention and Comparative Battery Z2). In particular, Comparative Batteries Y6, Y8, and Z2, in which the separator pore volume is less than 800 μm·% and the end-of-charge voltage is 4.30 V or higher, tend to show considerable deterioration in the storage performance in a charged state. In contrast, the storage performance in a charged state is suppressed from deteriorating in Battery A2 of the invention, in which the coating layer is provided on the negative electrode.

In addition, as clearly seen from Table 5, it was confirmed that Comparative Batteries Y6, Y8, and Z2, in which the separator pore volume is less than 800 μm·% and the end-of-charge voltage is 4.30 V or higher, showed such a behavior that the charge curve meandered during the recharge after the remaining capacity had been confirmed and the amount of charge increased significantly (see a meandering portion 1 of FIG. 3, which shows the charge-discharge characteristics of Comparative Battery Z2). In contrast, such a behavior was not observed in Battery A2 of the invention, in which the coating layer was provided on the negative electrode (see FIG. 4, illustrating the charge-discharge characteristics of Battery A2 of the invention).

Further, those with a separator pore volume of greater than 800 μm·% were also studied. The above-described behavior was not observed in Comparative Batteries Y5 and Y7, in which the end-of-charge voltage is 4.30 V and 4.35 V, respectively, but the above-described behavior was observed in Comparative Battery Z1, in which the end-of-charge voltage is 4.40 V. In contrast, the above-described behavior was not observed in Battery A1 of the invention, in which the coating layer was provided on the negative electrode. It should be noted that in the cases that the end-of-charge voltage was 4.20 V, the above-described behavior was not observed irrespective of the separator pore volume (not only in the case of Comparative Battery Y3 but also in the case of Comparative Battery Y4).

The foregoing results indicate that the less the pore volume of the separator, the greater the degree of deterioration. It is also indicated that the higher the battery voltage during storage, the more significant the degree of deterioration. However, as far as the behaviors are compared between the battery with an end-of-charge voltage of 4.20 V and that with an end-of-charge voltage of 4.30 V, it is understood that they show greatly different modes of deterioration, and the degree of deterioration is clearly more noticeable at an end-of-charge voltage of 4.30 V.

The reason is thought to be as follows, although the following may still be a matter of speculation. It can be speculated that in the storage test with an end-of-charge voltage of 4.20 V, the burden on the structure of the positive electrode is not so great that the adverse effect resulting from the dissolution or the like of Co from the positive electrode may be negligible, although there is a little adverse effect due to the decomposition of the electrolyte solution. For this reason, the effect of improvement resulting from the presence of the coating layer accordingly remains somewhat low. In contrast, when the end-of-charge voltage (storage voltage) of the battery is higher, the stability of the crystal structure of the charged positive electrode becomes poorer, and moreover, the voltage becomes close to the limit of oxidation resistant potential of cyclic carbonates and chain carbonates, which are commonly used for lithium-ion batteries. Therefore, it can be speculated that the production of side reaction products and the decomposition of the electrolyte solution proceed more than expected with the voltages at which lithium-ion batteries have been used, and this consequently increases the damages to the negative electrode and the separator oxidized potential.

Although the details are not yet clear, the abnormal charge behavior is believed to be due to a kind of shuttle reaction (production of a shuttle substance as a side reaction product) originating from the highly oxidizing atmosphere or the failures in charge/discharge resulting from clogging of the separator (the oxidation-reduction reaction of the side reaction product produced at a battery voltage of 4.30 V or higher), not due to the electrical conduction caused by the deposition of Li, Co, Mn, etc., or the breakage of the separator, considering the fact that the behavior completely disappears after several cycles. This behavior is believed to be caused principally by the oxidation-reduction reaction between the positive electrode and the negative electrode, so an improvement for preventing the abnormal behavior is possible by hindering the reaction products or the like from migrating from the positive electrode to the negative electrode.

From the foregoing results, these advantageous effects are especially significant when the separator has a pore volume of 800 μm·% or less. Further, the effects are also significant when the battery voltage during storage is 4.30 V or higher (i.e., the positive electrode potential is 4.40 V or higher versus a lithium reference electrode potential), more preferably 4.35 V or higher (i.e., the positive electrode potential is 4.45 V or higher versus a lithium reference electrode potential), and even more preferably 4.40 V or higher (i.e., the positive electrode potential is 4.50 V or higher versus a lithium reference electrode potential), in that improvements in discharge working voltage, improvements in remaining/recovery ratio, and elimination of abnormal charge behavior are achieved.

Third Group of Examples

The relationship between the physical properties of the coating layer and the storage performance in a charged state was investigated by varying the physical properties of the coating layer (the type of filler particles, the concentration of binder, and the thickness of the coating layer) formed on the surface of the negative electrode active material layer. The end-of-charge voltage was fixed at 4.40 V, the filling density of the positive electrode active material layer was fixed at and 3.60 g/cc, and the separator S1 was used. The results are as set forth below.

(Examples 1 to 4)
Batteries were fabricated in the same manner as described in Example 1 of the Fifth Group of Examples, except that in the slurries used for forming the coating layer of the positive electrode, the concentrations of the binder were 30 mass %, 20 mass %, 15 mass %, and 5 mass % with respect to the filler particles (titanium oxide).

The batteries fabricated in this manner are hereinafter referred to as Batteries C1 to C4 of the invention, respectively.

(Examples 5 to 8)
Batteries were fabricated in the same manner as described in Example 1 of the First Group of Examples, except that, in the slurry used for forming the coating layer of the negative electrode, the amount of filler particles (titanium oxide) was set at 20 mass % with respect to acetone, and the concentrations of the binder were set at 10 mass %, 5 mass %, 2.5 mass %, and 1 mass %, with respect to the filler particles.

The batteries fabricated in this manner are hereinafter referred to as Batteries C5 to C8 of the invention, respectively.

(Example 9)
A battery was fabricated in the same manner as described in Example 1 of the First Group of Examples, except that aluminum oxide (particle size 0.64 μm, AKP-3000 made by Sumitomo Chemical Co., Ltd.) was used as the filler particles in the slurry used for forming the coating layer of the negative electrode.

The battery fabricated in this manner is hereinafter referred to as Battery C9 of the invention.

(Examples 10 and 11)
Batteries were fabricated in the same manner as described in Example 1 of the First Group of Examples, except that the thicknesses of the coating layer of the negative electrode on both sides were 1 μm and 2 μm (0.5 μm and 1 μm per one side, respectively).

The batteries fabricated in this manner are hereinafter referred to as Batteries C10 and C11, respectively, of the invention.

(Experiment)
The storage performance in a charged state (remaining capacity after storage in a charged state) was determined for each of Batteries C1 through C11 of the invention. The results are shown in Tables 7 and 8 below. This table also shows the results for Battery A1 of the invention and Comparative Battery Z1.

The charge-discharge conditions, the storage conditions, and the method for determining the remaining capacity were the same as described in the experiment in the First Group of Examples.

TABLE 7

| Type of battery (Type of separator) | Separator | | | | | Negative electrode coating layer | |
|---|---|---|---|---|---|---|---|
| | Average pore size (μm) | Film thickness (μm) | Porosity (%) | Pore volume [film thickness × porosity] (μm %) | Formation | Type of filler particles | Concentration of filler particles with respect to acetone (mass %) |
| C1 (S1) | 0.6 | 18 | 45 | 810 | Yes | TiO$_2$ | 10 |
| C2 (S1) | | | | | | | |
| C3 (S1) | | | | | | | |
| A1 (S1) | | | | | | | |
| C4 (S1) | | | | | | | |
| C5 (S1) | | | | | | | 20 |
| C6 (S1) | | | | | | | |
| C7 (S1) | | | | | | | |
| C8 (S1) | | | | | | | |

TABLE 7-continued

| Type of battery (Type of separator) | Negative electrode coating layer | | | | |
|---|---|---|---|---|---|
| | Concentration of binder with respect to filler particles (mass %) | Thickness [Both sides] (μm) | Filling density of positive electrode active material layer (g/cc) | End-of-charge voltage(Positive electrode potential versus lithium reference electrode potential) (V) | Remaining capacity (%) |
| C1 (S1) | 30 | 4 | 3.60 | 4.40 | 65.4 |
| C2 (S1) | 20 | | | (4.50) | 70.5 |
| C3 (S1) | 15 | | | | 72.2 |
| A1 (S1) | 10 | | | | 67.4 |
| C4 (S1) | 5 | | | | 60.1 |
| C5 (S1) | 10 | | | | 71.1 |
| C6 (S1) | 5 | | | | 72.5 |
| C7 (S1) | 2.5 | | | | 74.3 |
| C8 (S1) | 1 | | | | 65.5 |

TABLE 8

| Type of battery (Type of separator) | Separator | | | | | Negative electrode coating layer | |
|---|---|---|---|---|---|---|---|
| | Average pore size (μm) | Film thickness (μm) | Porosity (%) | Pore volume [film thickness × porosity] (μm %) | Formation | Type of filler particles | Concentration of filler particles with respect to acetone (mass %) |
| C9 (S1) | 0.6 | 18 | 45 | 810 | Yes | Al$_2$O$_3$ | 10 |
| C10 (S1) | | | | | | TiO$_2$ | |
| C11 (S1) | | | | | | | |
| Comp. Z1 (S1) | | | | | No | — | — |

| Type of battery (Type of separator) | Negative electrode coating layer | | | | |
|---|---|---|---|---|---|
| | Concentration of binder with respect to filler particles (mass %) | Thickness [Both sides] (μm) | Filling density of positive electrode active material layer (g/cc) | End-of-charge voltage(Positive electrode potential versus lithium reference electrode potential) (V) | Remaining capacity (%) |
| C9 (S1) | 10 | 4 | 3.60 | 4.40 | 66.2 |
| C10 (S1) | | 2 | | (4.50) | 65.3 |
| C11 (S1) | | 1 | | | 60.0 |
| Comp. Z1 (S1) | — | — | | | 45.5 |

[Analysis]
(1) Overall Analysis

The results in Tables 7 and 8 clearly show that, in the storage test in a charged state, Batteries A1 and C1 to C11 of the invention, in which the coating layer is formed on the surface of the negative electrode active material layer, exhibit remarkable improvements in remaining capacity after storage in a charged state over Comparative Battery Z1, in which no coating layer is formed.

The reason is believed to be the same as described in the experiment of the above First Group of Examples.

(2) Analysis on Binder Concentration with Respect to Filler Particles (Titanium Oxide)

Comparing Battery A1 of the invention and Batteries C1 to C8 of the invention, it is seen that the effect of the present invention on the remaining capacity after storage in a charged state slightly varies because of the concentration of the filler particles (titanium oxide) acetone and the concentration of the binder with respect to the filler particles. More specifically, when the concentration of the filler particles with respect to acetone changes, the optimal value of the binder concentration with respect to the filler particles accordingly changes.

For example, comparing Battery A1 of the invention and Batteries C1 to C4 of the invention, in which the concentration of the filler particles with respect to acetone is 10 mass %, it is seen that all of Battery A1 of the invention and Batteries C1 to C3 of the invention, in which the binder concentration is from 10 mass % to 30 mass % with respect to the filler particles, have a remaining capacity of 65% or higher, whereas Battery C4 of the invention, in which the binder concentration is 5 mass % with respect to the filler particles, shows a remaining capacity of less than 65%. Accordingly, it is desirable that the binder concentration with respect to the filler particles be from 10 mass % to 30 mass % when the concentration of the filler particles is 10 mass % with respect to acetone. Moreover, comparing Batteries C5 to C8 of the invention, in which the concentration of the filler particles with respect to acetone is 20 mass %, it is observed that all the batteries have a remaining capacity of 65% or higher. Accordingly, it is desirable that the binder concentration with respect to the filler particles be from 1 mass % to 10 mass % when the concentration of the filler particles is 20 mass % with respect to acetone.

In addition, further experiments were carried out regarding the concentration of the filler particles and the binder concentration, and as a result, the following was confirmed. Here, for simplicity of description, the concentration of the filler particles herein is indicated by the value with respect to slurry, not the value with respect to solvent such as acetone. One example of the concentration of the filler particles with respect to the slurry is as follows; in the case of Battery C1 of the invention, $(10/113) \times 100 \approx 8.8$ mass %. This means that when the amount of acetone is 100 parts by mass, the amount of the filler particles is 10 parts by mass and the amount of the binder is 3 parts by mass, so the total amount of the slurry is 113 parts by mass.

As a result, it was found desirable that when the concentration of the filler particles is from 1 mass % to 15 mass % with respect to the slurry, the binder concentration be from 10 mass % to 30 mass % with respect to the filler particles. It was also found desirable that when the concentration of the filler particles exceeds 15 mass % with respect to the slurry (although it is desirable that the concentration of the filler particles be 50 mass % or less with respect to the slurry, considering the handleability of the coating layer during the formation), the binder concentration be from 1 mass % to 10 mass % with respect to the filler particles (particularly desirably from 2 mass % to 10 mass %).

The reasons are as follows.

a. The Reason for Restricting the Lower Limit of the Concentration of Binder with Respect to the Filler Particles When the binder concentration is too low with respect to the filler particles, the absolute amount of binder that can work between the filler particles and between the filler particles and the negative electrode active material layer is too small. As a consequence, the bonding strength between the coating layer and the negative electrode active material layer becomes too weak, and the coating layer is apt to peel off from the negative electrode active material layer. The lower limit values of the concentration of the binder with respect to the filler particles are set different depending on the concentrations of the filler particles with respect to the slurry. The reason is that the concentration of the binder in the slurry becomes higher when the concentration of the filler particles with respect to the slurry is high than when concentration of the filler particles with respect to the slurry is low. For example, both Battery A1 of the invention and Battery C5 of the invention have a binder concentration of 10 mass % with respect to the filler particles. However, in the case of Battery A1 of the invention, the binder concentration in the slurry is $1/111 \approx 0.9$ mass % (which means that when the amount of acetone is 100 parts by mass, the amount of filler particles is 10 parts by mass, and the amount of binder is 1 parts by mass, so the total amount of the slurry is 111 parts by mass), whereas in the case of Battery C5 of the invention, the binder concentration in the slurry is $2/122 \approx 1.6$ mass % (which means that when the amount of acetone is 100 parts by mass, the amount of filler particles is 20 parts by mass and the amount of binder is 2 parts by mass, so the total amount of the slurry is 122 parts by mass).

It was found that even when the amount of the binder is about 1 mass %, the binder is reasonably uniformly dispersed in the coating layer by the dispersion process such as the Filmics method. It was also found that even when the amount of the binder added is only about 2 mass %, the function as a filter as well as a high bonding strength is exerted remarkably.

In view of the foregoing, it is desirable that the concentration of binder with respect to the slurry be within the above-described range, considering the physical strength that can withstand the processing during the manufacture of the battery, the effect of filtering, sufficient dispersion capability of the inorganic particles in the slurry, and the like, although it is preferable that the concentration of binder in the slurry be as low as possible.

b. The Reason for Restricting the Upper Limit of the Concentration of Binder with Respect to the Filler Particles When considering the advantageous effect of the present invention, it is estimated that the filtering function becomes more significant when the thickness of the coating layer is greater or the concentration of the binder is higher with respect to the filler particles. However, it is believed that there is a trade-off between the advantageous effect of the present invention and the resistance increase between the electrodes (distance and mobility of lithium ions). Although not shown in Tables 7 and 8, it was found that when the binder concentration exceeds 50 mass % with respect to the filler particles, the battery can be charged and discharged only up to about half the design capacity, so the function as the battery becomes considerably poor, although it may depend on the concentration of the filler particles with respect to the slurry. The reason is believed to be that mobility of lithium ions extremely is lowered because the binder fills up the gaps between the filler particles of the coating layer or it covers a portion of the negative electrode active material layer surface.

For the above-described reason, it is desirable that the upper limit of the binder concentration be at least 50 mass % or less with respect to the filler particles (more desirably 30 mass % or less). In particular, as described above, it is preferable that the upper limit of the concentration of the binder be controlled with respect to the filler particles, according to the concentration of the filler particles with respect to the slurry. The upper limit values of the concentration of the binder with respect to the filler particles vary depending on the concentrations of the filler particles with respect to the slurry. The reason is the same as described in the foregoing "a. The reason for restricting the lower limit of the concentration of binder with respect to the filler particles".

(3) Analysis about Type of Filler Particles

When comparing Battery A1 of the invention and Battery C9 of the invention, almost no difference in remaining capacity after storage in a charged state is observed between them. Therefore, it is understood that advantageous effects of the present invention are not significantly influenced by the type of the filler particles.

(4) Analysis about Thickness of the Coating Layer

When comparing Battery A1 of the invention, Battery C10 of the invention, and Battery C11 of the invention, it is understood that Batteries A1 and C10 of the invention, in which the thickness of the coating layer on both sides is 2 μm or greater (1 μm or greater per one side), show higher remaining capacities after storage in a charged state than Battery C11 of the invention, in which the thickness of the coating layer on both sides is 1 μm (0.5 μm per one side). When the thickness of the coating layer is too large, however, the load characteristics and energy density of the battery degrade, although not shown in Tables 7 and 8. Taking these things into consideration, it is preferable that the thickness of the coating layer be controlled to 4 μm or less per one side, more desirably 2 μm or less, and still more desirably from 1 μm to 2 μm. In the above Batteries A1, C10, and C11 of the invention, the thickness of the coating layer per one side is set at ½ of the thickness on both sides (in other words, the thickness of the coating layer on one side is made equal to the thickness of the coating layer on the other side). However, such a configuration is merely illustrative, and it is possible to make the thickness of the coating layer on one side and the thickness of the coating layer on the other side different from each other. Even in this case, however, it is desirable that each thickness of the coating layers be within the foregoing range.

Fourth Group of Examples

The relationship between the filling density of the positive electrode active material layer and the storage performance in a charged state was investigated by varying the filling density of the positive electrode active material layer. The end-of-charge voltage was set at 4.40 V, the thickness of the coating layer was set at 4 μm, and the separator S2 was used. The results are as set forth below.

(Example 1)

A battery was fabricated in the same manner as described in Example 2 of the First Group of Examples, except that the filling density of the positive electrode active material layer was set at 3.20 g/cc.

The battery fabricated in this manner is hereinafter referred to as Battery D1 of the invention.

(Comparative Example 1)

A battery was fabricated in the same manner as described in Comparative Example 2 of the First Group of Examples, except that the filling density of the positive electrode active material layer was set at 3.20 g/cc.

The battery fabricated in this manner is hereinafter referred to as Comparative Battery X1.

(Comparative Example 2)

A battery was fabricated in the same manner as described in Comparative Example 2 of the First Group of Examples, except that the filling density of the positive electrode active material layer was set at 3.40 g/cc.

The battery fabricated in this manner is hereinafter referred to as Comparative Battery X2.

(Comparative Example 3)

A battery was fabricated in the same manner as described in Comparative Example 2 of the First Group of Examples, except that the filling density of the positive electrode active material layer was set at 3.80 g/cc.

The battery fabricated in this manner is hereinafter referred to as Comparative Battery X3.

(Experiment)

The storage performance in a charged state (the remaining capacity after storage in a charged state) was determined for each of Battery D1 of the invention and Comparative Batteries X1 to X3. The results are shown in Table 9 below. This table also shows the results for Battery A2 of the invention and Comparative Battery Z2.

The charge-discharge conditions, the storage conditions, and the method for determining the remaining capacity were the same as described in the experiment in the First Group of Examples.

TABLE 9

| Type of battery (Type of separator) | Separator | | | | Formation | Negative electrode coating layer Concentration of titanium oxide with respect to acetone (mass %) |
|---|---|---|---|---|---|---|
| | Average pore size (μm) | Film thickness (μm) | Porosity (%) | Pore volume [film thickness × porosity] (μm %) | | |
| D1 (S2) | 0.1 | 12 | 38 | 456 | Yes | 10 |
| Comp. X1 (S2) | | | | | No | — |
| Comp. X2 (S2) | | | | | | — |
| A2 (S2) | | | | | Yes | 10 |
| Comp. Z2 (S2) | | | | | No | — |
| Comp. X3 (S2) | | | | | | — |

| Type of battery (Type of separator) | Negative electrode coating layer Concentration of binder with respect to titanium oxide (mass %) | Thickness [Both sides] (μm) | Filling density of positive electrode active material layer (g/cc) | End-of-charge voltage(Positive electrode potential versus lithium reference electrode potential) (V) | Remaining capacity (%) |
|---|---|---|---|---|---|
| D1 (S2) | 10 | 4 | 3.20 | 4.40 | 65.3 |
| Comp. X1 (S2) | — | — | | (4.50) | 45.5 |
| Comp. X2 (S2) | — | — | 3.40 | | 0.1 |
| A2 (S2) | 10 | 4 | 3.60 | | 68.9 |
| Comp. Z2 (S2) | — | — | | | 0.1 |
| Comp. X3 (S2) | — | — | 3.80 | | 0.1 |

As clearly seen from Table 9, when the positive electrode active material layer had a filling density of 3.20 g/cc, a certain degree of remaining capacity was obtained not only in Battery D1 of the invention but also in Comparative Battery X1. On the other hand, when the positive electrode active material layer had a filling density of 3.40 g/cc or greater, Battery A2 of the invention exhibited a certain degree of remaining capacity but Comparative Batteries Z2, X2, and X3 showed very poor remaining capacity. This phenomenon is believed to be accounted for by the surface area of the positive electrode active material layer that comes in contact with the electrolyte solution and the degree of deterioration of the location where side reactions occur.

Specifically, when the filling density of the positive electrode active material layer is low (less than 3.40 g/cc), the deterioration proceeds uniformly over the entire region of the negative electrode active material layer, not locally, so the deterioration does not significantly affect the charge-discharge reactions after storage. As a result, the capacity degradation is suppressed to a certain degree, not only in Battery D1 of the invention but also in Comparative Battery X1. In contrast, when the filling density is high (3.40 g/cc or higher), the deterioration takes place mainly in the outermost surface layer of the negative electrode active material layer, so the entry and diffusion of lithium ions in the positive electrode active material during discharge become the rate-determining processes, and therefore, the degree of the deterioration is larger in Comparative Batteries Z2, X2, and X3. On the other hand, in Battery A2 of the invention, the deterioration in the outermost surface layer of the negative electrode active material layer is suppressed because of the presence of the coating layer, so the entry and diffusion of lithium ions in the positive electrode active material during discharge do not become the rate-determining processes, and the degree of the deterioration is smaller.

When the filling density of the negative electrode active material layer was varied from 1.30 g/cc to 1.80 g/cc while the filling density of the positive electrode active material layer was fixed, the results were not as significant as the case of varying the filling density of the positive electrode active material layer. Essentially, the side reaction products and dissolution substances produced on the positive electrode are trapped by the coating layer and are prevented from migrating to the separator and the negative electrode. Therefore, the advantageous effect is not dependent on the filling density of the negative electrode active material layer. The negative electrode merely contributes to reduction reactions of the by-products and dissolution substances, so various substances in addition to graphite may be used without limitation as long as the substances are capable of the oxidation-reduction reactions.

From the foregoing results, it is demonstrated that the advantageous effects of the present invention are particularly evident when the positive electrode active material layer has a filling density of 3.40 g/cc or greater. The filling density of the negative electrode and the type of the active material are not particularly limited.

Fifth Group of Examples

The relationship between addition of $Al_2O_3$ and the storage performance in a charged state was investigated. The end-of-charge voltage was fixed at 4.40 V and the filling density of the positive electrode active material layer was fixed at and 3.60 g/cc. The separator S1 was used. The physical properties of the coating layer formed on the surface of the negative electrode active material layer (i.e., the type of filler particles, the concentration of binder, and the thickness of the coating layer) were also fixed, and $Al_2O_3$ was added to the positive electrode. The results are as set forth below.

(Example)

A battery was fabricated in the same manner as described in Example 1 of the First Group of Examples, except that, when preparing the positive electrode, $Al_2O_3$ was added to the lithium cobalt oxide in an amount of 1 mass % before mixing the lithium cobalt oxide and acetylene black, and mixed by a dry method.

The battery fabricated in this manner is hereinafter referred to as Battery E of the invention.

(Comparative Example)

A battery was fabricated in the same manner as described in Example above, except for using a negative electrode in which no coating layer was formed on the surface of the negative electrode active material layer.

The battery fabricated in this manner is hereinafter referred to as Comparative Battery W.

(Experiment)

The storage performance in a charged state (the remaining capacity after storage in a charged state) was studied determined for Battery E of the invention and Comparative Battery W. The results are shown in Table 10 below. This table also shows the results for Battery A1 of the invention and Comparative Battery Z1.

The charge-discharge conditions, the storage conditions, and the method for determining the remaining capacity were the same as described in the experiment in the First Group of Examples.

TABLE 10

| Type of battery (Type of separator) | Separator | | | | | Negative electrode coating layer | |
|---|---|---|---|---|---|---|---|
| | Average pore size (μm) | Film thickness (μm) | Porosity (%) | Pore volume [film thickness × porosity] (μm %) | Formation | Concentration of filler particles with respect to acetone (mass %) | Concentration of binder with respect to filler particles (mass %) |
| E (S1) A1 (S1) | 0.6 | 18 | 45 | 810 | Yes | 10 | 10 |
| Comp. W (S1) | | | | | No | — | — |
| Comp. Z1 (S1) | | | | | | — | — |

TABLE 10-continued

| Type of battery (Type of separator) | Negative electrode coating layer | | Filling density of positive electrode active material layer (g/cc) | End-of-charge voltage(Positive electrode potential versus lithium reference electrode potential) (V) | Remaining capacity (%) |
|---|---|---|---|---|---|
| | Thickness [Both sides] (μm) | Addition of $Al_2O_3$ in positive electrode | | | |
| E (S1) | 4 | Yes | 3.60 | 4.40 (4.50) | 79.6 |
| A1 (S1) | | No | | | 67.4 |
| Comp. W (S1) | — | Yes | | | 47.2 |
| Comp. Z1 (S1) | — | No | | | 45.5 |

[Analysis]

The results shown in Table 10 clearly demonstrate that, in the storage test in a charged state, Battery E of the invention, in which $Al_2O_3$ was added to the positive electrode and the coating layer was formed on the surface of the negative electrode active material layer, exhibited a significant improvement in remaining capacity after storage in a charged state over not only Comparative Battery Z1, in which no coating layer was formed on the surface of the negative electrode active material layer and no $Al_2O_3$ was added to the positive electrode, but also Comparative Battery W, in which no coating layer was formed on the surface of the negative electrode active material layer but $Al_2O_3$ was added to the positive electrode, and Battery A1 of the invention, in which no $Al_2O_3$ was added to the positive electrode but the coating layer was formed on the surface of the negative electrode active material layer.

The reason is as follows. When the positive electrode contains $Al_2O_3$ as Battery E of the invention, the catalytic property of the positive electrode active material can be alleviated. Thus, it becomes possible to impede such reaction as the dissolution of Co and the decomposition reaction of the electrolyte solution at the conductive carbon surface adhering to the positive electrode active material or between the electrolyte solution and the positive electrode active material. Nevertheless, these reactions cannot be completely inhibited, and a small amount of reaction products are produced. However, when the coating layer is formed on the surface of the negative electrode active material layer as in Battery E of the invention, migration of the reaction products is sufficiently impeded. Therefore, the storage performance in a charged state remarkably improves.

On the other hand, in Battery A1 of the invention, migration of the reaction products can be impeded because the coating layer is formed on the surface of the negative electrode active material layer; however, the catalytic property of the positive electrode active material cannot be alleviated since $Al_2O_3$ is not contained in the positive electrode. In Comparative Battery W, the catalytic property of the positive electrode active material can be alleviated since $Al_2O_3$ is contained in the positive electrode; however, migration of the reaction products cannot be impeded because the coating layer is not formed on the surface of the negative electrode active material layer. In Comparative Battery Z1, the catalytic property of the positive electrode active material cannot be alleviated since $Al_2O_3$ is not contained in the positive electrode; moreover, migration of the reaction products cannot be impeded because the coating layer is not formed on the surface of the negative electrode active material layer.

Comparison between Comparative Battery W and Comparative Battery Z1, both of which do not have the coating layer formed on the surface of the negative electrode active material layer, shows that the effect of adding $Al_2O_3$ to the positive electrode is limited. Comparison between Battery E of the invention and Battery A1 of the invention, both of which have the coating layer formed on the surface of the negative electrode active material layer, shows that the effect of adding $Al_2O_3$ to the positive electrode is remarkably significant. From this result as well, it is seen that a more significant effect can be obtained by forming the coating layer on the surface of the negative electrode active material layer.

It was found preferable that the amount of the $Al_2O_3$ contained in the positive electrode be from 0.1 mass % to 5 mass % with respect to the amount of the positive electrode active material (in particular, from 1 mass % to 5 mass %). If the amount is less than 0.1 mass %, the effect of adding $Al_2O_3$ cannot be fully exhibited, whereas if the amount exceeds 5 mass %, the relative amount of the positive electrode active material decreases, lowering the battery capacity.

B. Examples Related to the Second Embodiment

Sixth Group of Examples

The relationship of the storage performance in a charged state (remaining capacity) with the presence or absence of the coating layer and the type and concentration of lithium salt was investigated by varying the presence or absence of the coating layer and the type of lithium salt, while the end-of-charge voltage and the physical properties of the separator were fixed. The results are set forth below.

(Example 1)

A battery prepared in the manner described in the above second embodiment was used for Example 1.

The battery fabricated in this manner is hereinafter referred to as Battery F1 of the invention.

(Examples 2 and 3)

Batteries were fabricated in the same manner as described in Example 1 above, except that the amount of $LiBF_4$ was set at 3 mass % and 5 mass % with respect to the total amount of the electrolyte solution.

The batteries fabricated in this manner are hereinafter referred to as Batteries F2 and F3 of the invention, respectively.

(Comparative Example 1)

A battery was fabricated in the same manner as described in Example 1 above, except that $LiBF_4$ was not added to the electrolyte solution.

The battery fabricated in this manner is hereinafter referred to as Comparative Battery V1.
(Comparative Example 2)

A battery was fabricated in the same manner as described in Comparative Example 1 above, except that no coating layer was formed on the negative electrode.

The battery fabricated in this manner is hereinafter referred to as Comparative Battery V2.
(Comparative Examples 3 to 5)

Batteries were fabricated in the same manner as described in Examples 1 through 3 above, except that no coating layer was formed on the negative electrode.

The batteries thus fabricated are hereinafter referred to as Comparative Batteries V3 through V5, respectively.
(Experiment)

The storage performance in a charged state (the remaining capacity after storage in a charged state) was determined for each of Batteries F1 to F3 of the invention and Comparative Batteries V1 to V5. The results are shown in Table 11 below. The charge-discharge conditions and storage conditions were as follows.

[Charge-discharge Conditions]
Charge Conditions

Each of the batteries was charged at a constant current of 1.0It (750 mA) until the battery voltage reached a predetermined voltage (i.e., the above-described end-of-charge voltage, 4.40 V for all the batteries in the present experiment [equivalent to a positive electrode potential of 4.50 V versus a lithium reference electrode]), and thereafter charged at the predetermined voltage until the current value reached 1/20It (37.5 mA).

Discharge Conditions

Each of the batteries was discharged at a constant current of 1.0 It (750 mA) until the battery voltage reached 2.75 V.

The interval between the charge and the discharge was 10 minutes.

[Storage Conditions]

Each of the batteries was charged and discharged one time according to the above-described charge-discharge conditions, and was again charged according to the charge conditions specified above to the predetermined voltage. Then, each of the charged batteries was set aside at 60° C. for 5 days.

[Determination of Remaining Capacity]

Each of the batteries was cooled to room temperature and discharged under the same conditions as the above-described discharge conditions, to measure the remaining capacity. Using the discharge capacity obtained at the first time discharge after the storage test and the discharge capacity obtained before the storage test, the remaining capacity was calculated using the following equation (4).

Remaining capacity (%)=(Discharge capacity obtained at the first-time discharge after storage test/Discharge capacity obtained before storage test)×100    (4)

TABLE 11

| Type of battery (Type of separator) | Physical properties of separator | | | | Coating layer | | Type of lithium salt (Concentration [amount]) | End-of-charge voltage (Positive electrode potential versus lithium reference electrode potential) (V) | Remaining capacity (%) | Separator coloring |
|---|---|---|---|---|---|---|---|---|---|---|
| | Average pore size (μm) | Film thickness (μm) | Porosity (%) | Pore volume [film thickness × porosity] (μm %) | Formation | Location | | | | |
| Comp. V1 (S3) | 0.1 | 16 | 47 | 752 | Yes | Negative electrode surface | LiPF$_6$ (1.0M) | 4.40 (4.50) | 60.3 | Slightly colored |
| Comp. V2 (S3) | | | | | No | — | | | 16.4 | Observed |
| F1 (S3) | | | | | Yes | Negative electrode surface | LiPF$_6$ + LiBF$_4$ (1.0M) [1 mass %] | | 72.8 | Not observed |
| Comp. V3 (S3) | | | | | No | — | | | 61.3 | Slightly colored |
| F2 (S3) | | | | | Yes | Negative electrode surface | LiPF$_6$ + LiBF$_4$ (1.0M) [3 mass %] | | 74.5 | Not observed |
| Comp. V4 (S3) | | | | | No | — | | | 69.2 | Slightly colored |
| F3 (S3) | | | | | Yes | Negative electrode surface | LiPF$_6$ + LiBF$_4$ (1.0M) [5 mass %] | | 78.8 | Not observed |
| Comp. V5 (S3) | | | | | No | — | | | 72.0 | Slightly colored |

The amount of LiBF$_4$ is indicated by the values with respect to total amount of electrolyte solution.

[Analysis]
(1) Overall Analysis

The results shown in Table 11 clearly demonstrate that although the end-of-charge voltage and the physical properties of the separator are identical in all the batteries, Batteries F1 to F3 of the invention, in which the coating layer is formed on the negative electrode (the surface of the negative electrode active material layer) and LiBF$_4$ is added to the electrolyte solution, show greater remaining capacities (better storage performance in a charged state) than Comparative Battery V2, in which no coating layer is formed on the negative electrode and no LiBF$_4$ is added to the electrolyte solution, Comparative Battery V1, in which the coating layer is formed on the negative electrode but no LiBF$_4$ is added to the electrolyte solution, and Comparative Batteries V3 to V5, in which LiBF$_4$ is added to the electrolyte solution but no coating layer is formed on the negative electrode. The reason will be discussed below, in terms of the advantage of adding LiBF$_4$ to the electrolyte solution and the advantage of forming the coating layer.

(2) Analysis on the Advantage of Adding $LiBF_4$ to Electrolyte Solution

First, when comparing the batteries in which no coating layer is formed on the surface of the negative electrode (i.e., Comparative Batteries V2 to V5) with each other, it is observed that Comparative Batteries V3 to V5, in which $LiBF_4$ is added to the electrolyte solution, show a greater remaining capacity than Comparative Battery V2, in which no $LiBF_4$ is added to the electrolyte solution. On the other hand, when comparing the batteries in which the coating layer is formed on the negative electrode (Batteries F1 to F3 of the invention and Comparative Battery V1) as well, Batteries F1 to F3, in which $LiBF_4$ is added to the electrolyte solution, show greater remaining capacities than Comparative Battery V1, in which $LiBF_4$ is not added to the electrolyte solution. This is believed to be due to the following reason.

First, possible causes of the deterioration in storage performance in a charged state will be considered. There are several possible cases, but the primary causes are believed to be as follows, taking into consideration that the positive electrode active material is used up to about 4.5 V versus the lithium reference electrode (the battery voltage is 0.1 V lower than that, i.e., about 4.4 V).

(I) The decomposition of the electrolyte solution in a strong oxidizing atmosphere due to the higher charge potential of the positive electrode.

(II) The deterioration due to the structure of the charged positive electrode active material that becomes unstable.

Not only do these bring about the deteriorations of the positive electrode and the electrolyte solution but also affect the clogging of the separator and the deterioration of the negative electrode active material that results from the deposit on the negative electrode, particularly because of the decomposition product of the electrolyte solution and the dissolution of the elements from the positive electrode active material, which are believed to be due to the above (I) and (II).

When $LiBF_4$ is added to the electrolyte solution as described above, a surface film originating from the $LiBF_4$ is formed on the surface of the positive electrode active material. Thus, the presence of the surface film serves to hinder dissolution of the substances constituting the positive electrode active material (Co ions and Mn ions) and decomposition of the electrolyte solution on the positive electrode surface. As a result, the storage performance in a charged state is hindered from deteriorating.

Evidence Showing that the Improvement in the Storage Performance in a Charged State Results from the Addition of $LiBF_4$ As a method for checking whether or not there are decomposition products or dissolution substances from the positive electrode in a simple manner, there is a method of checking the coloring state of the separator and the like. This method serves the purpose for the following reason. The Co ions and the like that have dissolved away from the positive electrode react with the electrolyte solution and adhere to the separator or the like. The coloring conditions of the separator changes according to the reaction at that time.

After the foregoing test finished, the batteries were disassembled, and the discoloration of the separator was observed. The results are also shown in Table 11. As clearly seen from Table 11, comparison between the batteries in which no coating layer was formed on the negative electrode (Comparative Batteries V2 to V5) shows that the separator was slightly colored in Comparative Batteries V3 to V5, in which $LiBF_4$ was added to the electrolyte solution, whereas the degree of coloring was greater in Comparative Battery V2, in which no $LiBF_4$ was added to the electrolyte solution. On the other hand, comparison between the batteries in which the coating layer is formed on the negative electrode (Batteries F1 to F3 of the invention and Comparative Battery V1) also shows that the separator was not colored in Batteries F1 to F3 of the invention, in which $LiBF_4$ was added to the electrolyte solution, whereas the separator was slightly colored in Comparative Battery V1, in which no $LiBF_4$ was added to the electrolyte solution. From the results, it is believed that the addition of $LiBF_4$ serves to prevent dissolution of the substances constituting the positive electrode active material (such as Co ions or Mn ions) and decomposition of the electrolyte solution on the positive electrode surface, alleviating damages to the separator and the negative electrode.

(3) Analysis on the Advantage of Forming the Coating Layer

First, when comparing the batteries in which $LiBF_4$ is not added to the electrolyte solution (i.e., Comparative Batteries V1 and V2) with each other, it is observed that Comparative Battery V1, in which the coating layer is formed on the negative electrode, shows a greater remaining capacity than Comparative Battery V2, in which no coating layer is formed on the negative electrode. Likewise, when comparing the batteries in which $LiBF_4$ is added to the electrolyte solution (Batteries F1 to F3 of the invention and Comparative Batteries V3 to V5) with each other, Batteries F1 to F3 of the invention, in which the coating layer is formed on the negative electrode, show greater remaining capacities than Comparative Batteries V3 to V5, in which no coating layer is formed on the negative electrode. This is believed to be due to the following reason.

When the electrolyte solution contains $LiBF_4$ as described above, a surface film originating from the $LiBF_4$ is formed on the surface of the positive electrode active material. Nevertheless, it is difficult to cover the positive electrode active material completely with the surface film originating from $LiBF_4$, so it is difficult to prevent the dissolution of the substances constituting the positive electrode active material and the decomposition of the electrolyte solution on the positive electrode surface sufficiently.

In view of this, when the coating layer is formed on the negative electrode as described above, the decomposition products of the electrolyte solution and the Co ions and the like that have dissolved away from the positive electrode are trapped by the coating layer, which impedes the decomposition products and so forth from migrating to the separator and the negative electrode, causing deposition→reaction (deterioration), and clogging the separator. In other words, the coating layer exhibits a filtering function so that the Co and the like are prevented from depositing on the negative electrode. As a result, it is believed that the batteries having the coating layer show improvements in storage performance in a charged state over the batteries in which no coating layer is formed.

Evidence Showing that the Improvement in the Storage Performance in a Charged State Results from the Filtering Effect As clearly seen from Table 11, when comparing the batteries in which $LiBF_4$ is not added to the electrolyte solution (i.e., Comparative Batteries V1 and V2) with each other, the separator is slightly colored in Comparative Battery V1, in which the coating layer is formed on the negative electrode, but the degree of coloring is greater in Comparative Battery V2, in which no coating layer is formed on the negative electrode. On the other hand, when comparing the batteries in which $LiBF_4$ is added to the electrolyte solution (Batteries F1 to F3 of the invention and Comparative Batteries V3 to V5) with each other, the separators are not colored in Batteries F1 to F3 of the invention, in which the coating layer is formed on the negative electrode, but the separators are slightly colored in Comparative Batteries V3 to V5, in which no coating layer is formed on the negative electrode. From these results, it is believed that the coating layer serves to hinder the reaction product formed at the positive electrode from migrating, whereby damages to the separator and the negative electrode are alleviated.

It should be noted that many of water-insoluble binders for the coating layer expand about two times in volume at the time of preparing the separator after the electrolyte solution is filled, although it does not adversely affect the air permeability, so the gaps between the inorganic particles in the coating layer are filled up appropriately. This coating layer has a complicated, complex structure and the inorganic particles are firmly bonded to each other by the binder component. As a result, the strength is improved and the filtering effect can be exhibited sufficiently (i.e., the trapping effect becomes high since it has a complex structure even with a small thickness).

Although the storage performance in a charged state may improve to a certain degree even when the filter layer is formed by a polymer layer only, the filtering effect will not be exhibited sufficiently unless the thickness of the polymer layer is sufficiently large, because the filtering effect in this case is dependent on the thickness of the polymer layer. Moreover, the filter capability weakens unless a completely non-porous structure is attained by the expansion of the polymer. Furthermore, the electrolyte solution permeability to the negative electrode becomes poor because the entire surface of the negative electrode is covered, so the adverse effects such as degradation in the load characteristics become greater. Therefore, in order to exert the filtering effect and at the same time minimize the adverse effects to other characteristics, it is more advantageous to form a coating layer (filter layer) containing filler particles (titanium oxide in the present example) rather than to form the filter layer by a polymer alone.

(4) Conclusion

From the foregoing (2) and (3), it is believed that Batteries F1 to F3 of the invention achieve remarkable improvements in storage performance in a charged state by the following synergistic effect. The addition of $LiBF_4$ to the electrolyte solution serves the effect of preventing the substances that constitute the positive electrode active material (such as Co ions or Mn ions) from dissolving away from the positive electrode, and preventing the electrolyte solution from decomposing on the positive electrode surface. Moreover, the formation of the coating layer on the negative electrode serves the filtering effect.

(5) Analysis on Other Aspects in the Experiment

Comparing Batteries F1 to F3 of the invention shows that the higher the concentration of the $LiBF_4$ added to the electrolyte solution, the greater the improvement effect of the storage performance in a charged state. From this fact, it may appear that the problem can be solved by increasing the concentration of $LiBF_4$ added to the electrolyte solution (to put it extremely, the coating layer may be seen unnecessary if the concentration of the $LiBF_4$ added is made extremely high). However, the present inventors have found that if the concentration of $LiBF_4$ is raised excessively, the battery characteristics (initial performance) other than the storage performance in a charged state are apt to deteriorate. The reasons are as follows.

When the amount of $LiBF_4$ added is too large, the surface film formed on the positive electrode surface becomes too thick since $LiBF_4$ has high reactivity, and moreover, a surface film originating from $LiBF_4$ is also formed on the negative electrode surface. Therefore, the Li intercalation and deintercalation do not take place smoothly, resulting in the initial capacity. On the other hand, when the amount of the amount of $LiBF_4$ added is too small, it is difficult to prevent the dissolution of the substances constituting the positive electrode active material and the decomposition of the electrolyte solution on the positive electrode surface sufficiently, although the initial capacity is prevented from deteriorating. Thus, the effect of improving storage performance in a charged state becomes small. For this reason, it is important to control the thickness of the surface film on the positive electrode surface and the negative electrode surface by restricting the amount of $LiBF_4$ added.

In order to improve the storage performance in a charged state without degrading the initial performance, it is important to control the thickness of the surface film on the positive electrode surface and the negative electrode surface by controlling the lithium salt concentration and the amount of added $LiBF_4$ appropriately and to suppress the dissolution substances from the positive electrode and the decomposition products of the electrolyte solution to a degree such that they can be trapped by the coating layer. Bearing the foregoing in mind, the present inventors conducted a study and as a result found that it is preferable to control the amount of $LiBF_4$ from 0.1 mass % to 5.0 mass % with respect to the total amount of the non-aqueous electrolyte in the case that the concentration of $LiPF_6$ in the electrolyte solution is controlled to be in the range of from 0.6 M to 2.0 M. Thereby, while the initial performance degradation resulting from the surface film formed by the addition of $LiBF_4$ is prevented, the dissolution substances and the decomposition products are impeded to such a degree that they can be trapped by the coating layer. As a result, the storage performance in a charged state improves remarkably.

Seventh Group of Examples

The relationship of the storage performance in a charged state (remaining capacity) with the end-of-charge voltage, the presence or absence of the coating layer, and the addition of $LiBF_4$ was investigated by varying the end-of-charge voltage, the presence or absence of the coating layer, and the addition of $LiBF_4$ (the amount of the $LiBF_4$ was fixed at 3 mass %), while the physical properties of the separator were fixed. The results are set forth below.

(Examples 1 and 2)

Batteries were fabricated in the same manner as described in Example 2 of the Sixth Group of Examples, except that the batteries were designed to have end-of-charge voltages of 4.30 V and 4.35 V (positive electrode potentials of 4.40 V and 4.45 V, respectively, versus a lithium reference electrode) and have a negative/positive electrode capacity ratio of 1.08 at each of the potentials.

The batteries fabricated in this manner are hereinafter referred to as Batteries G1 and G2 of the invention, respectively.

(Comparative Example 1)

A battery was fabricated in the same manner as described in Example 2 of the Sixth Group of Examples, except that the battery was designed to have an end-of-charge voltage of 4.20 V (a positive electrode potential of 4.30 V versus a lithium reference electrode) and have a negative/positive electrode capacity ratio of 1.08 at that potential.

The battery fabricated in this manner is hereinafter referred to as Comparative Battery U1.

(Comparative Examples 2 to 4)

Batteries were fabricated in the same manners as described in the just-described Comparative Example 1, the just-described Example 1, and the just-described Example 2, except that $LiBF_4$ was not added to the electrolyte solution.

The batteries fabricated in this manner are hereinafter referred to as Comparative Batteries U2, U5, and U8, respectively.

(Comparative Examples 5 to 7)

Batteries were fabricated in the same manners as described in the just-described Comparative Example 1, the just-described Example 1, and the just-described Example 2, except that no coating layer was formed on the negative electrode surface.

The batteries fabricated in this manner are hereinafter referred to as Comparative Batteries U3, U6, and U9, respectively.

(Comparative Examples 8 to 10)

Batteries were fabricated in the same manners as described in the just-described Comparative Example 1, the just-described Example 1, and the just-described Example 2, except that no $LiBF_4$ was added to the electrolyte solution and no coating layer was formed on the negative electrode surface.

The batteries fabricated in this manner are hereinafter referred to as Comparative Batteries U4, U7, and U10, respectively.

(Experiment)

The storage performance in a charged state (the remaining capacity after storage in a charged state) was determined for each of Batteries G1 and G2 of the invention as well as Comparative Batteries U1 to U10. The results are shown in Tables 12 and 13 below. This table also shows the results for the previously-described Battery F2 of the invention and the previously-described Comparative Batteries V1, V2, and V4.

The charge-discharge conditions, the storage conditions, and the method for determining the remaining capacity were the same as described in the experiment in the Sixth Group of Examples (however, regarding the storage conditions, Comparative Batteries U1 to U4, having an end-of-charge voltage of 4.20 V, were set aside at 80° C. for 20 days).

TABLE 12

| Type of battery (Type of separator) | Physical properties of separator | | | | Coating layer | | LiBF$_4$ | | End-of-charge voltage (Positive electrode potential versus lithium reference electrode potential) (V) | Remaining capacity (%) |
|---|---|---|---|---|---|---|---|---|---|---|
| | Average pore size (μm) | Film thickness (μm) | Porosity (%) | Pore volume [film thickness × porosity] (μm %) | Formation | Location | Addition | Amount with respect to total amount of electrolyte solution | | |
| Comp. U1 (S3) | 0.1 | 16 | 47 | 752 | Yes | Negative electrode surface | Yes | 3 mass % | 4.20 (4.30) | 84.1 |
| Comp. U2 (S3) | | | | | | | No | — | | 88.7 |
| Comp. U3 (S3) | | | | | No | — | Yes | 3 mass % | | 82.8 |
| Comp. U4 (S3) | | | | | | | No | — | | 88.3 |
| G1 (S3) | | | | | Yes | Negative electrode surface | Yes | 3 mass % | 4.30 (4.40) | 85.7 |
| Comp. U5 (S3) | | | | | | | No | — | | 84.5 |
| Comp. U6 (S3) | | | | | No | — | Yes | 3 mass % | | 83.9 |
| Comp. U7 (S3) | | | | | | | No | — | | 66.9 |

TABLE 13

| Type of battery | Physical properties of separator | | | | Coating layer | | LiBF$_4$ | | End-of-charge voltage (Positive electrode potential versus lithium reference electrode potential) (V) | Remaining capacity (%) |
|---|---|---|---|---|---|---|---|---|---|---|
| | Average pore size (μm) | Film thickness (μm) | Porosity (%) | Pore volume [film thickness × porosity] (μm %) | Formation | Location | Addition | Amount with respect to total amount of electrolyte solution | | |
| G2 (S3) | 0.1 | 16 | 47 | 752 | Yes | Negative electrode surface | Yes | 3 mass % | 4.35 (4.45) | 81.9 |
| Comp. U8 (S3) | | | | | | | No | — | | 77.4 |
| Comp. U9 (S3) | | | | | No | — | Yes | 3 mass % | | 72.2 |
| Comp. U10 (S3) | | | | | | | No | — | | 23.0 |
| F2 (S3) | | | | | Yes | Negative electrode | Yes | 3 mass % | 4.40 (4.50) | 74.5 |

TABLE 13-continued

| | Physical properties of separator | | | | Coating layer | | LiBF$_4$ | End-of-charge | |
|---|---|---|---|---|---|---|---|---|---|
| Type of battery | Average pore size (μm) | Film thickness (μm) | Porosity (%) | Pore volume [film thickness × porosity] (μm %) | Formation | Location | Addition | Amount with respect to total amount of electrolyte solution | voltage (Positive electrode potential versus lithium reference electrode potential) (V) | Remaining capacity (%) |
| Comp. V1 (S3) | | | | | | surface | No | — | | 60.3 |
| Comp. V4 (S3) | | | | | No | — | Yes | 3 mass % | | 69.2 |
| Comp. V2 (S3) | | | | | | | No | — | | 16.4 |

[Analysis]
(1) Analysis on the Case that the End-of-Charge Voltage is 4.20 V (the Positive Electrode Potential is 4.30 V Versus a Lithium Reference Electrode)

The results in Tables 12 and 13 clearly show that in the case that the end-of-charge voltage is 4.20 V, Comparative Battery U1, in which the coating layer is formed on the negative electrode surface and LiBF$_4$ is added, shows a lower remaining capacity (i.e., poorer storage performance in a charged state) than Comparative Battery U4, in which no coating layer is formed on the negative electrode surface and no LiBF$_4$ is added, and Comparative Battery U2, in which the coating layer is formed on the negative electrode surface but no LiBF$_4$ is added. This is believed to be due to the following reason.

In the case that the end-of-charge voltage is 4.20 V, the burden on the structure of the positive electrode is not so great that the dissolution of Co ions and Mn ions from the positive electrode is little, and the amount of the reaction products produced by the decomposition of the electrolyte solution or the like is also small. As described above, LiBF$_4$ has the advantage of forming a surface film on the positive electrode surface and thereby hindering, for example, dissolution substances from the positive electrode active material and decomposition of the electrolyte solution. Nevertheless, LiBF$_4$ has a drawback of reducing the concentration of the lithium salt and reducing the conductivity of the electrolyte solution because LiBF$_4$ is highly reactive with the positive electrode. For this reason, if LiBF$_4$ is added even in the case that the adverse effects of the dissolution of Co ions from the positive electrode or the like are small, the advantage of addition of LiBF$_4$ is superseded by the drawback of addition of LiBF$_4$. As a consequence, it is believed that the foregoing results of the experiment were obtained.

Additionally, Comparative Battery U1, in which the coating layer is formed on the negative electrode surface and LiBF$_4$ is added, shows almost the same degree of storage performance in a charged state as Comparative Battery U2, in which the coating layer is formed on the negative electrode surface but no LiBF$_4$ is added. Therefore, it is understood that the formation of the coating layer is not so effective in the case that the end-of-charge voltage is 4.20 V.

(2) Analysis on the Case that the End-of-Charge Voltage is 4.30 V (the Positive Electrode Potential is 4.40 V Versus a Lithium Reference Electrode)

On the other hand, in the case that the end-of-charge voltage is 4.30 V or higher, Batteries G1, G2, and F2 of the invention, in which the coating layer is formed on the negative electrode surface and LiBF$_4$ is added, exhibit higher remaining capacities (i.e., higher storage performance in a charged state) compared to the Comparative Batteries with the same end-of-charge voltages (for example, compared to Comparative Batteries U5 to U7 in the case of Battery G1 of the invention), such as Comparative Batteries U7, U10, and V2, in which no coating layer is formed on the negative electrode surface and no LiBF$_4$ is added, Comparative Batteries U6, U9, and V4, in which LiBF$_4$ is added but no coating layer is formed on the negative electrode surface, and Comparative Batteries U5, U8, and V1, in which the coating layer is formed on the negative electrode surface but no LiBF$_4$ is added. Moreover, it is seen that as the end-of-charge voltage becomes higher, the difference in the storage performance in a charged state between the Batteries of the invention and Comparative Batteries is greater (for example, the difference between Battery G2 of the invention and Comparative Batteries U8 to U10 is greater than the difference between Battery G1 of the invention and Comparative Batteries U5 to U7). This is believed to be due to the following reason.

As the end-of-charge voltage (voltage during storage) becomes higher, the crystal structure of the charged positive electrode becomes unstable, and moreover the voltage becomes close to the limit of oxidation resistant potential of cyclic carbonates and chain carbonates, which are commonly used in the lithium-ion batteries. As a consequence, the dissolution of Co ions or the like and the decomposition of the electrolyte solution proceed to a greater degree than is expected with the voltages at which non-aqueous electrolyte secondary batteries have been used. In such a case, the addition of LiBF$_4$ and the formation of the coating layer are worthwhile.

Specifically, when LiBF$_4$ is added in such a case as described above, the advantageous effect can be exhibited sufficiently that the formation of the surface film originating from LiBF$_4$ on the positive electrode surface impedes the dissolution of Co ions and Mn ions from the positive electrode and the decomposition of the electrolyte solution. In other words, the advantage is exhibited such that the above-mentioned drawback of addition of LiBF$_4$ is superseded. This is evident when comparing Batteries U7, U10, and V2 of the invention to Comparative Batteries U6, U9, and V4 (compare the batteries having the same end-of-charge voltage).

Nevertheless, only the addition of LiBF$_4$ still brings about deterioration of the remaining capacity after storage because Co ions and Mn ions dissolve away in a small amount from the positive electrode active material or the decomposition of the electrolyte solution or the like occurs. In view of this, the coating layer is formed on the negative electrode surface so that the reaction products or the like that cannot be stopped completely by the surface film originating from LiBF$_4$ can be trapped completely by the coating layer, which impedes the reaction products and the like from migrating to the separator and the negative electrode, causing deposition-→reaction (deterioration), and clogging. Thereby the storage performance in a charged state can be improved remarkably. This will be clear when comparing Batteries G1, G2, and F2 of the invention and Comparative Batteries U6, U9, and V4 (compare the batteries having the same end-of-charge voltage).

[Other Embodiments]

(1) Preferable examples of the materials of the binder are not limited to the copolymer containing an acrylonitrile unit, but may also include PTFE (polytetrafluoroethylene), PVDF (polyvinylidene fluoride), PAN (polyacrylonitrile), SBR (styrene-butadiene rubber), modified substances thereof, derivatives thereof, and polyacrylic acid derivatives. However, the copolymers containing an acrylonitrile unit and polyacrylic acid derivatives are preferable in that they exhibit the binder effect with a small amount.

(2) The positive electrode active material is not limited to lithium cobalt oxide. Other usable materials include lithium composite oxides containing cobalt or manganese, such as lithium cobalt-nickel-manganese composite oxide, lithium aluminum-nickel-manganese composite oxide, and lithium aluminum-nickel-cobalt composite oxide, as well as spinel-type lithium manganese oxides. Preferably, the positive electrode active material shows a capacity increase by being charged at a higher voltage than 4.3 V verses the potential of a lithium reference electrode, and preferably has a layered structure. Moreover, such positive electrode active materials may be used either alone or in combination with other positive electrode active materials.

(3) The method for mixing the positive electrode mixture is not limited to wet-type mixing techniques, and it is possible to employ a method in which a positive electrode active material and a conductive agent are dry-blended in advance, and thereafter PVDF and NMP are mixed and agitated together.

(4) The negative electrode active material is not limited to graphite as described above. Various other materials may be employed, such as coke, tin oxides, metallic lithium, silicon, and mixtures thereof, as long as the material is capable of intercalating and deintercalating lithium ions.

(5) The lithium salt in the electrolyte (or the lithium salt mixed with LiBF$_4$ in the case of the second embodiment) is not limited to LiPF$_6$, and various other substances may be used, including LiN(SO$_2$CF$_3$)$_2$, LiN(SO$_2$C$_2$F$_5$)$_2$, LiPF$_{6-x}$(C$_n$F$_{2n+1}$)$_x$ (wherein 1<x<6 and n=1 or 2), which may be used either alone or in combination. The concentration of the lithium salt is not particularly limited, but it is preferable that the concentration of the lithium salt be restricted in the range of from 0.8 moles to 1.5 moles per 1 liter of the electrolyte. The solvents for the electrolyte are not particularly limited to ethylene carbonate (EC) and diethyl carbonate (DEC) mentioned above, and preferable solvents include carbonate solvents such as propylene carbonate (PC), γ-butyrolactone (GBL), ethyl methyl carbonate (EMC), and dimethyl carbonate (DMC). More preferable is a combination of a cyclic carbonate and a chain carbonate.

(6) The present invention may be applied not only to liquid-type batteries but also to gelled polymer batteries. In this case, usable examples of the polymer materials include polyether-based solid polymer, polycarbonate-based solid polymer, polyacrylonitrile-based solid polymer, oxetane-based polymer, epoxy-based polymer, and copolymers or cross-linked polymers comprising two or more of these polymers, as well as PVDF. Any of the above examples of the polymer materials may be used in combination with a lithium salt and an electrolyte, to form a gelled solid electrolyte.

INDUSTRIAL APPLICABILITY

The present invention is suitable for driving power sources for mobile information terminals such as mobile telephones, notebook computers, and PDAs, especially for use in applications that require a high capacity. The invention is also expected to be used for high power applications that require continuous operations under high temperature conditions, such as HEVs and power tools, in which the battery operates under severe operating environments.

Figure 1:
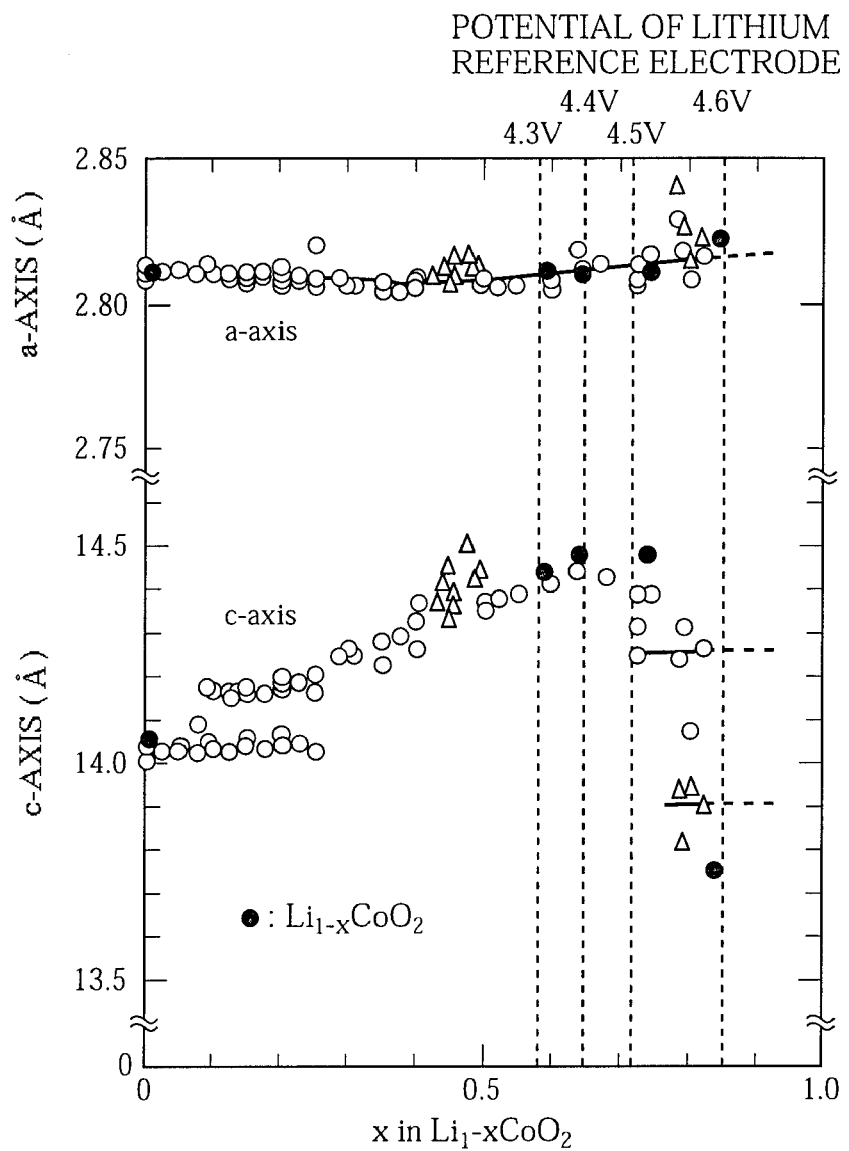
FIG. 1 is a graph illustrating the relationship between potential and change in the crystal structure of lithium cobalt oxide.
Figure 2:
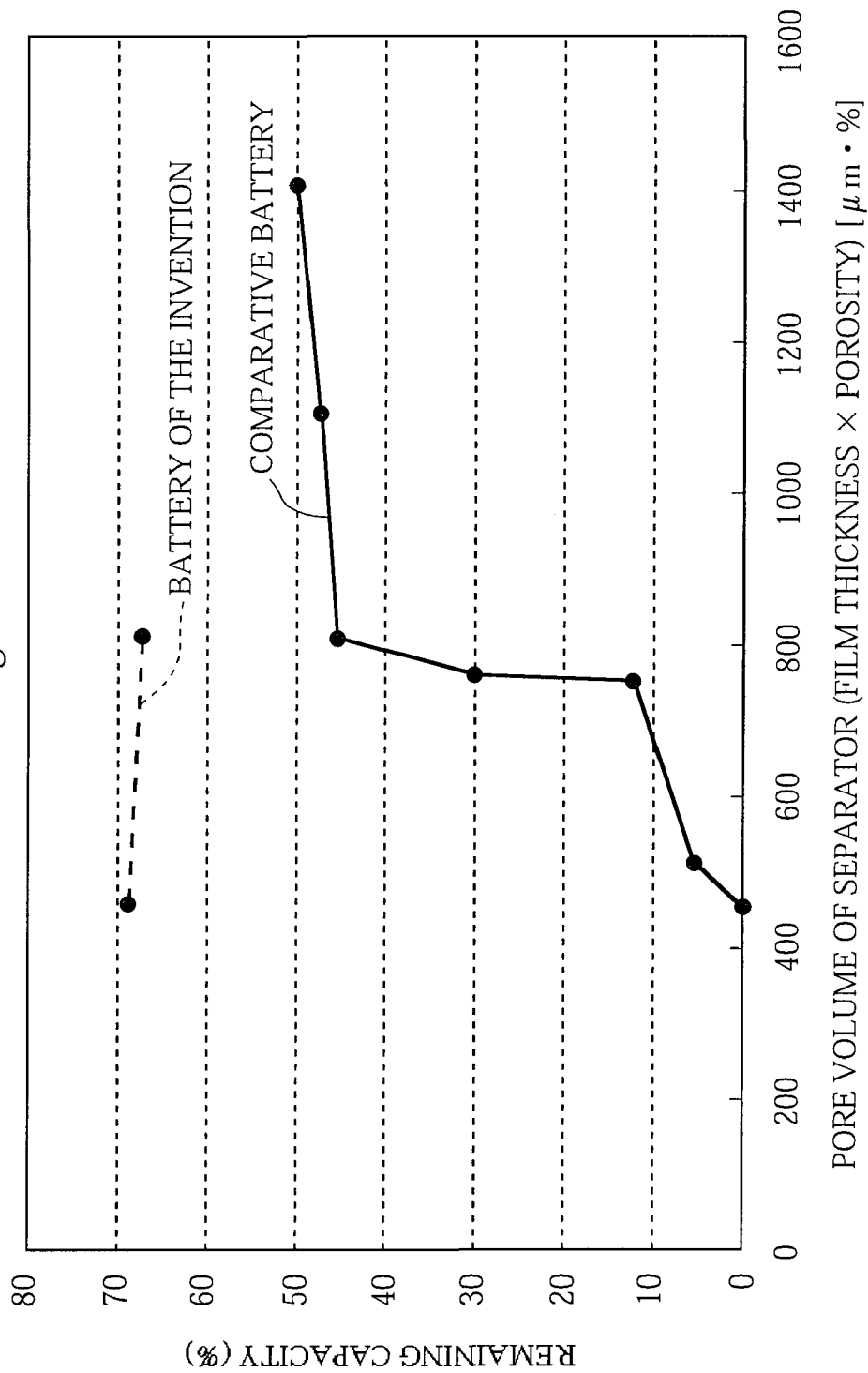
FIG. 2 is a graph illustrating the relationship between separator pore volumes and remaining capacities after storage in a charged state.
Figure 3:
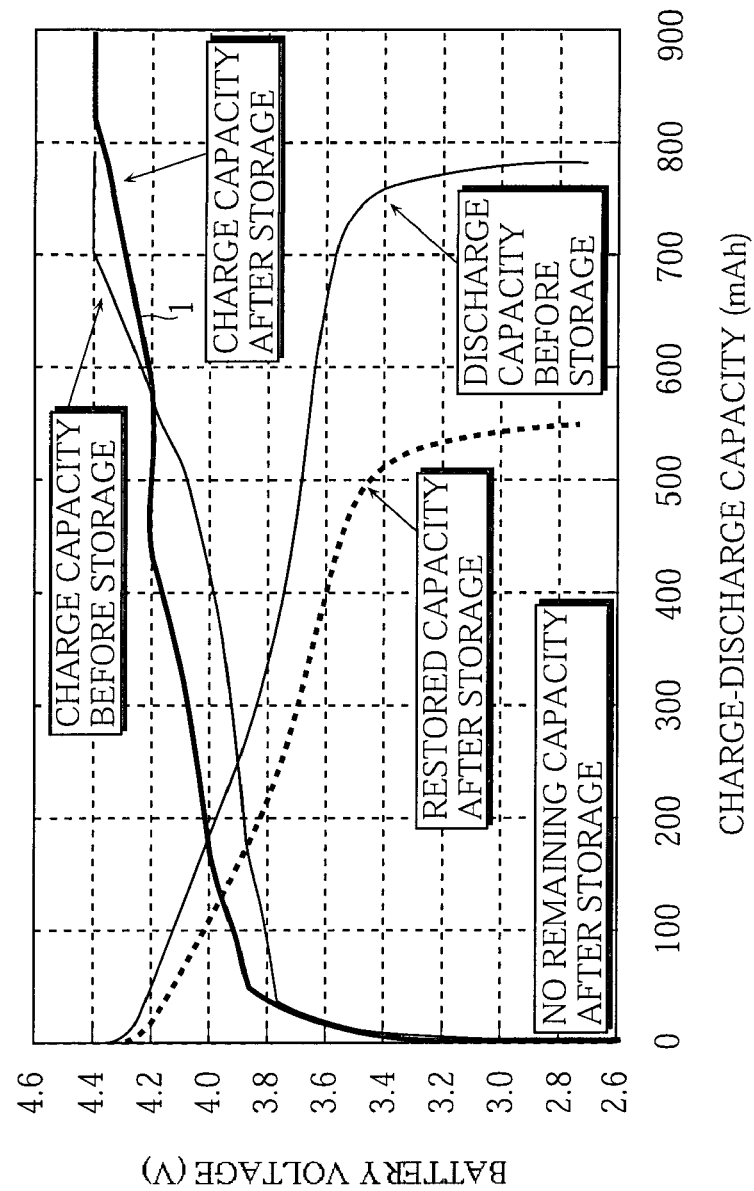
FIG. 3 is a graph illustrating the relationship between charge-discharge capacity and battery voltage in Comparative Battery Z2.
Figure 4:
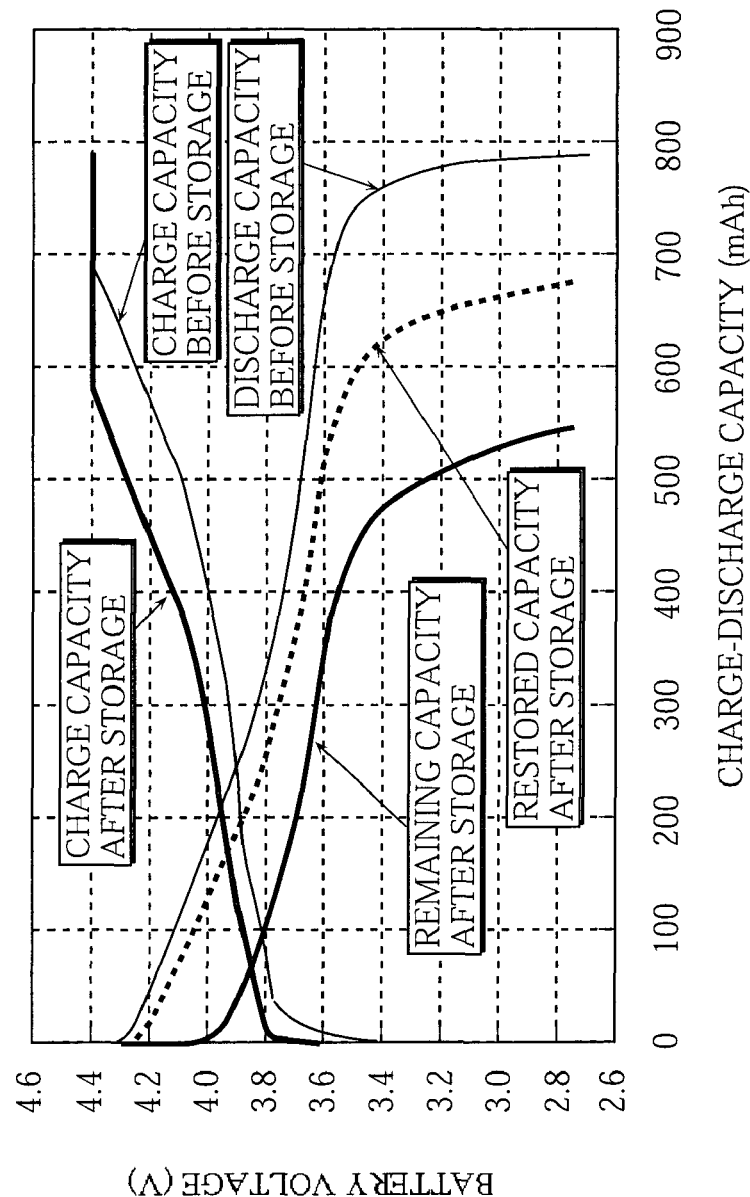
FIG. 4 is a graph illustrating the relationship between charge-discharge capacity and battery voltage in Battery A2 of the invention.

DESCRIPTION OF REFERENCE NUMERALS 1 meandering portion

The invention claimed is:

1. A non-aqueous electrolyte battery comprising: a positive electrode having a positive electrode active material layer containing a positive electrode active material; a negative electrode having a negative electrode active material layer containing a negative electrode active material; a separator interposed between the positive electrode and the negative electrode; an electrode assembly comprising the positive electrode, the negative electrode, and the separator; and a non-aqueous electrolyte comprising a solvent and a lithium salt, the non-aqueous electrolyte being impregnated in the electrode assembly, wherein:
the positive electrode active material contains at least cobalt or manganese; and a coating layer consisting of filler particles and binder is provided between the negative electrode active material layer and the positive electrode active material layer, wherein the filler particles have an average particle size greater than an average pore size of the separator; and
wherein a product of x and y, where x (μm) is a thickness of the separator and y is a porosity (%) of the separator, is less than 1500 (μm·%).

2. The non-aqueous electrolyte battery according to claim 1,
wherein the coating layer is provided between the negative electrode active material layer and the separator.

3. The non-aqueous electrolyte battery according to claim 1,
wherein the coating layer is provided on the negative electrode active material layer.

4. The non-aqueous electrolyte battery according to claim 1,
wherein the product of x and y is less than 800 (μm·%).

5. The non-aqueous electrolyte battery according to claim 1, wherein the filler particles comprise inorganic particles.

6. The non-aqueous electrolyte battery according to claim 1, wherein the binder comprises a copolymer containing an acrylonitrile unit, or a polyacrylic acid derivative.

* * * * *